(12) United States Patent
Atkinson

(10) Patent No.: US 7,234,109 B2
(45) Date of Patent: Jun. 19, 2007

(54) EQUALITY OF EXTENSIBLE MARKUP LANGUAGE STRUCTURES

(75) Inventor: Bob Atkinson, Woodinville, WA (US)

(73) Assignee: Microsoft Corp., Redmond, WA (US)

( * ) Notice: Subject to any disclaimer, the term of this patent is extended or adjusted under 35 U.S.C. 154(b) by 381 days.

(21) Appl. No.: 10/298,578

(22) Filed: Nov. 19, 2002

(65) Prior Publication Data

US 2004/0098667 A1   May 20, 2004

(51) Int. Cl.
*G06F 17/00* (2006.01)
(52) U.S. Cl. ............... 715/513; 715/511; 715/524
(58) Field of Classification Search ............... 715/513
See application file for complete search history.

(56) References Cited

U.S. PATENT DOCUMENTS

| | | |
|---|---|---|
| 5,499,369 A | 3/1996 | Atkinson |
| 5,506,983 A | 4/1996 | Atkinson et al. |
| 5,511,197 A | 4/1996 | Hill et al. |
| 5,581,760 A | 12/1996 | Atkinson et al. |
| 5,608,909 A | 3/1997 | Atkinson et al. |
| 5,613,124 A | 3/1997 | Atkinson et al. |
| 5,682,536 A | 10/1997 | Atkinson et al. |
| 5,689,703 A | 11/1997 | Atkinson et al. |
| 5,701,424 A | 12/1997 | Atkinson |
| 5,706,504 A | 1/1998 | Atkinson et al. |
| 5,710,928 A | 1/1998 | Atkinson |
| 5,715,441 A | 2/1998 | Atkinson et al. |
| 5,724,588 A | 3/1998 | Hill et al. |
| 5,740,439 A | 4/1998 | Atkinson et al. |
| 5,842,018 A | 11/1998 | Atkinson et al. |
| 5,892,904 A | 4/1999 | Atkinson et al. |
| 5,911,066 A | 6/1999 | Williams et al. |
| 6,064,406 A | 5/2000 | Atkinson et al. |
| 6,182,108 B1 | 1/2001 | Williams et al. |
| 6,240,407 B1* | 5/2001 | Chang et al. ................. 707/2 |
| 6,263,379 B1 | 7/2001 | Atkinson et al. |
| 6,268,924 B1 | 7/2001 | Koppolu et al. |
| 6,334,157 B1 | 12/2001 | Oppermann et al. |
| 6,367,012 B1 | 4/2002 | Atkinson et al. |
| 6,418,446 B1* | 7/2002 | Lection et al. .......... 707/103 R |
| 6,519,764 B1 | 2/2003 | Atkinson et al. |
| 6,658,490 B1 | 12/2003 | Williams et al. |
| 6,697,997 B1* | 2/2004 | Fujimura ................. 715/501.1 |
| 6,708,196 B1 | 3/2004 | Atkinson et al. |
| 6,721,951 B1 | 4/2004 | Williams et al. |
| 6,728,879 B1 | 4/2004 | Atkinson |
| 6,842,741 B1* | 1/2005 | Fujimura ..................... 705/59 |

(Continued)

OTHER PUBLICATIONS

Aissi, et al., "Schema Centric XML Canonicalization Version 1.0", Universal Description, Discovery and Integration (UDDI) Working Draft, Feb. 2002.*

(Continued)

*Primary Examiner*—Doug Hutton
*Assistant Examiner*—Amelia Rutledge
(74) *Attorney, Agent, or Firm*—Banner & Witcoff, Ltd.

(57) ABSTRACT

A computer-implemented mechanism for comparing information sets is described. The mechanism may include a comparison system that concentrates on the schema in each information set. An alternative embodiment includes an equality comparison mechanism that performs sets of initial comparisons to determine whether the information sets are inherently different and not needing a detailed comparison using the schema-centric comparison technique.

4 Claims, 21 Drawing Sheets

U.S. PATENT DOCUMENTS

| | | | |
|---|---|---|---|
| 6,856,993 | B1 | 2/2005 | Verma et al. |
| 2003/0167446 | A1* | 9/2003 | Thomas ...................... 715/513 |
| 2003/0200504 | A1 | 10/2003 | Atkinson et al. |
| 2004/0034770 | A1 | 2/2004 | Kaler et al. |
| 2004/0073518 | A1 | 4/2004 | Atkinson et al. |
| 2004/0098277 | A1 | 5/2004 | Atkinson et al. |
| 2004/0098346 | A1 | 5/2004 | Atkinson et al. |
| 2004/0098347 | A1 | 5/2004 | Atkinson et al. |
| 2004/0098492 | A1 | 5/2004 | Atkinson et al. |
| 2004/0098602 | A1 | 5/2004 | DeTreville et al. |
| 2004/0098667 | A1 | 5/2004 | Atkinson |
| 2005/0120036 | A1 | 6/2005 | Verma et al. |
| 2005/0120059 | A1 | 6/2005 | Verma et al. |
| 2005/0138085 | A1 | 6/2005 | Verma et al. |
| 2005/0149525 | A1 | 7/2005 | Verma et al. |

OTHER PUBLICATIONS

Fujimura, et. al., "General-purpose Digital Ticket Framework", Proceedings of the 3rd USENIX Workshop on Electronic Commerce, Boston, MA, Sep. 1998.*

Clark et al., "XML Path Language (XPath) Version 1.0", W3C Recommendation Nov. 1999, Appendix B, "XML Information Set Mapping (Non-Normative)".*

Skonnard, "The XML Files: Addressing Infosets with XPath", MSDN Magazine, Jul. 2000.*

Boyer, "Canonical XML Version 1.0", W3C Recommendation Mar. 2001.*

Boyer, et. al. "Exclusive XML Canonicalization Version 1.0", W3C Candidate Recommendation, Feb. 2002.*

Lindstrom, "Special Report: The Language of XML Security", Network Magazine, Jun. 2001.*

Boyer, et. al., "RE: Schema Centric Canonicalization algorithm", http://lists.w3.org/Archives/Public/w3c-ietf-xmidsig/2002JanMar/0203.html.*

Bray et al., "Canonical XML Version 1.0", W3C Working Draft published Jan. 2000, p. 1-12.*

XML-Signature Syntax and Processing: W3C Recommendation Feb. 12, 2002 (http://www.w3.org/2000/09/xmldsig). pp. 1-64.

A Namespace Name for xmlns Attributes. Feb. 23, 2000. (http://www.w3.org/2000/xmlns) p. 1.

XML Schema Part I: Structures: W3C Recommendation May 2, 2001 (http://www.w3.org/TR/xmlschema-1). pp. 1-203.

XML Schema Part 1: Structures: W3C Recommendation May 2, 2001 (http://www.w3.org/TR/2001/REC-xmlschema-1-20010502). pp. 1-202.

XML Schema http://www.w3.org/2001/XMLSchema (Feb. 13, 2001). p. 1.

Resource Directory Description Language (RDDL) (http://www.rddl.org) Feb. 18, 2002. pp. 1-12.

DTD for XML Schemas: Part 1. (http://www.w3.org/2001/XMLSchema.dtd). Oct. 24, 2001. pp. 1-7.

XML Schema XSD (http://www.w3.org/2001/XMLSchema.xsd) May 27, 2002. pp. 1-44.

XML Schema Instance (http://www.w3.org/2001/XMLSchema-instance). p. 1.

XML Path Language (XPath) (http://www.w3.org/TR/1999/REC-xpath-19991116). pp. 1-37.

Atkinson, Bob. "Schema Centric XML Canonicalization Version 1.0." Oasis UDDI Spec TC. http://uddi.org/pubs/SchemaCentric-Canonicalization-20050523.htm. May 23, 2005.

Bellwood et al., Tom. "UDDI Version 3.0: UDDI Spec Technical Committee Specification, Jul. 19, 2002." http://uddi.org/pubs/uddi-v3.00-published-20020719.htm. Jul. 19, 2002.

Atkinson et al. Bob. "Web Services Security (WS-Security) Version 1.0 Apr. 5, 2002." http://www-106.ibm.com/developerworks/webservices/library/ws-secure/. Apr. 5, 2002.

Thurston et al., Gene. "Web Services Security: SOAP Message Security 1.0 (WS-Security 2004)". Oasis Standard 200401, Mar. 15, 2004. http://docs.oasis-open.org/wss/2004/01/oasis-200401-wss-soap-message-security-1.0.pdf.

Atkinson et al., Bob. "UDDI Spec TC Change Request Element-only Whitespace." http://www.oasis-open.org/committees/uddi-spec/doc/cr/uddi-spec-tc-cr062-element_only_whitespce-20040217.doc Feb. 17, 2004.

Ferguson et al., Donald. "Secure, Reliable, Transacted Web Services: Architecture and Composition" http://www-128.ibm.com/developerworks/webservices/library/ws-securtrans/index.html Oct. 23, 2003.

Boyer et a., John. "Exclusive XML Canonicalization Version 1.0 W3C Recommendation Jul. 18, 2002". http://www.w3.org/TR/2002/REC-xml-exc-c14n-20020718/ Jul. 18, 2002.

* cited by examiner

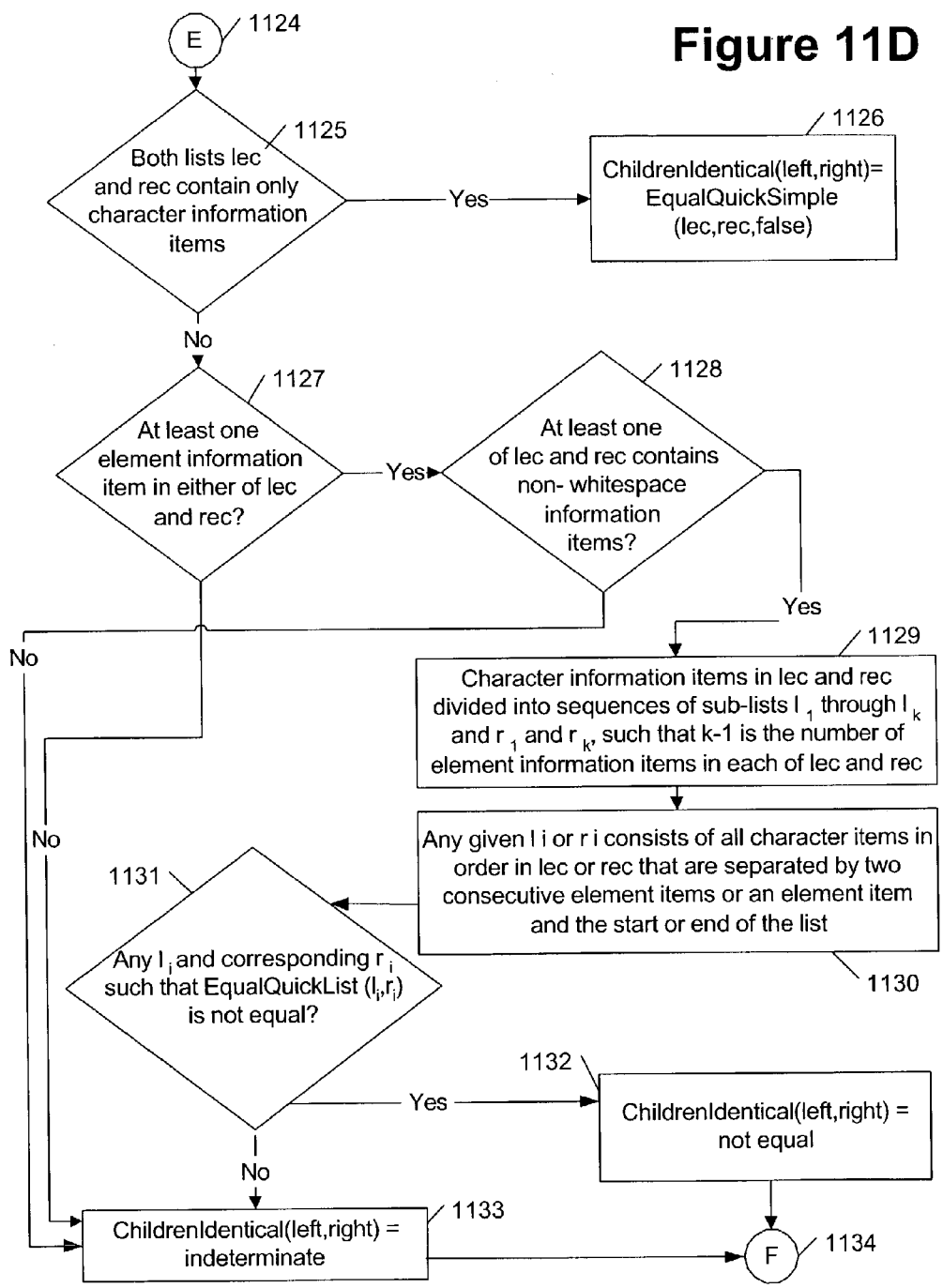

EQUALITY OF EXTENSIBLE MARKUP LANGUAGE STRUCTURES

TECHNICAL FIELD

Aspects of the present invention relate to extensible markup language. More particularly, aspects of the present invention provide a mechanism for determining, in light of extensibility, whether two XML information items are equivalent.

BACKGROUND OF THE INVENTION

Various communication paradigms exist where the entities using the paradigms have agreed upon the constructs of the communication languages. Some examples include EDI (electronic data interchange), http, html, and the like. Some entities add additional constructs to the language over time. Standards bodies meet to decide whether the additional constructs of the language should be adopted into the adopted language versions promoted by the standards bodies. In this way, the languages evolve.

Despite this ability to evolve, general communication languages fail to meet the needs of entities that need to grant specific rights to and/or check the grant of these rights. The languages used need to be flexible enough to grant rights in various circumstances yet maintain the robustness of acceptance from the standards bodies. To this end, authorization policy languages have developed to meet this need for the granting and sharing of rights.

FIG. 1A illustrates a conventional mechanism for granting rights to access a resource using an authorization policy language. A trusted issuer 100 issues a license 102 to a principal 104. License 102 allows principal 104 to use a resource 106. Resource 106 may be a digital work in the form of an image, an audio or video file, or an e-book. The license 102 identifies the principal 104, the resource 106, the right granted and any conditions.

One of the compelling reasons why authorization policy languages are needed is to provide issuing entities with the ability to routinely grant rights to consumers in a consistent manner. As each grant is effectively unique, the issuer needs to be able to consistently check and grant access to customers having accepted the issued rights. Various rights languages (for example, XrML (extensible rights markup language)) permit flexibility in the construction of the actual grant (for example, the order of the information in the grant from one issuer to another may differ or the internal format of the document may differ). This ability of one issuer to unknowingly differ from the construct provided by another issuer for a similar grant creates uncertainty for entities that need to check the grants when presented.

For example, if one purchases a right from music source "A" to listen to music from any of music sources "A," "B," or "C," one would expect that the purchaser would be able to enjoy the purchased right (here, listening to music from any of sources A, B, or C). However, if the structure of A's grant of rights is not identical to the expected structure of a grant from either music sources B or C, one runs the risk that B or C may not respect the grant from A (namely, listening to music from A, B, or C) purchased by the purchaser. Here, B and C would need to compare the grant from A against a grant they expect to permit access to their music. In highly structured environments (for example, where each of A, B, and C share the same infrastructure for granting rights), this risk is minimized. However, in dynamically-definable languages (where the language may evolve, grow, and otherwise be extended over time) such as the extensible markup language (XML) and the extensible rights markup language (XrML), the possibility of a first issuer providing a grant that affects a second issuer where the second user needs to compare the XML or XrML information for equality (that is, to see if they logically represent the same semantic information) increases.

An example of the degree of exactness required follows. Here, two elements are represented:

<foo xmlns="http://afirstsite.org/ns"
someAttribute="someValue"/> and

<pre:foo xmlns:pre="http://afirstsite.org/ns"/>.

These two elements should or should not compare as equal depending on whether the schema for the namespace indicated provides a default for the 'someAttribute' attribute of the 'foo' element with contents 'someValue'.

If the XML schemas associated with the XML data are known to or complied into the application (for example, the applications at B and C) attempting the comparison, then the comparison should be straightforward one, as all the requisite and important semantics may be assumed to be known to the application (here, the applications at B and C).

However, if the XML schemas are not well integrated into the application (for example, shipped with the application), but are provided at a later time (for example, during runtime as part of the context in which the comparison is to be carried out or defined in an application extension), then the task of comparing the two sets of information is more difficult. One reason for the difficulty is the priority or significance of the information in each in set needs to be dynamically determined.

A process by which one can attempt to compare the two sets of information makes use of a significant sub-process which may be referred to as canonicalization. The canonicalization sub-process regularlizes the representation of each set of information to which it is applied (or 'canonicalizes' it). Two sets of information can then be compared by canonicalizing each, then simply comparing the resultant representations to see if they are bit-for-bit identical.

This is illustrated in FIG. 1B. It is desired that two sets of information, 110 and 120, be compared for equality. An appropriate canonicalization algorithm is chosen, and said algorithm applied to each, resulting in, respectively, representations 111 and 121. These representations are then directly compared to see whether they are identical. In this example, they are; thus, information sets 110 and 120 are considered equal.

In general there are a variety of possible algorithms for carrying out the canonicalization process, some of them existing as prior art in the literature. However, not canonicalization algorithms are equally suitable to being used as a sub-process of XML equality comparison, for some fail to consider some important aspects or properties of the sets of information as being appropriate for regularization. Indeed, none of the prior art algorithms are fully suitable, as each fails to consider one or more crucial aspects of the information sets. A need thus exists for use in XML equality comparison of a canonicalization algorithm which fully and completely regularizes exactly the appropriate set of aspects or properties of the information sets as are considered semantically significant according to the relevant XML standards specifications.

However, even when such a suitable canonicalization algorithm exists, a need further exists for an efficient implementation of XML equality comparison. Executing canonicalization algorithms tends to be expensive, and should be avoided unless absolutely necessary. Thus, a need also exists for a second algorithm which, when it can do so quickly, carries out XML equality comparison without resorting to the use of canonicalization (for example: if two information sets are already identical, they are necessarily equal, and no canonicalization is needed) yet when it cannot do so quickly yields its task to the full canonicalize-and-compare approach.

SUMMARY

One or more of the above-mentioned needs in the art are satisfied by the disclosed approach to determining of two information sets are equal. The two information sets may be compared outright using a disclosed process or may be compared at various levels first. Using the disclosed system and method, a more robust comparison may be made between the two information sets.

BRIEF DESCRIPTION OF THE DRAWINGS

Aspects of the present invention are described with respect to the accompanying figures, in which like reference numerals identify like elements, and in which:

FIGS. 11A-F show an equalQuickItem function in accordance with embodiments of the invention;

DETAILED DESCRIPTION

Figure 1A:
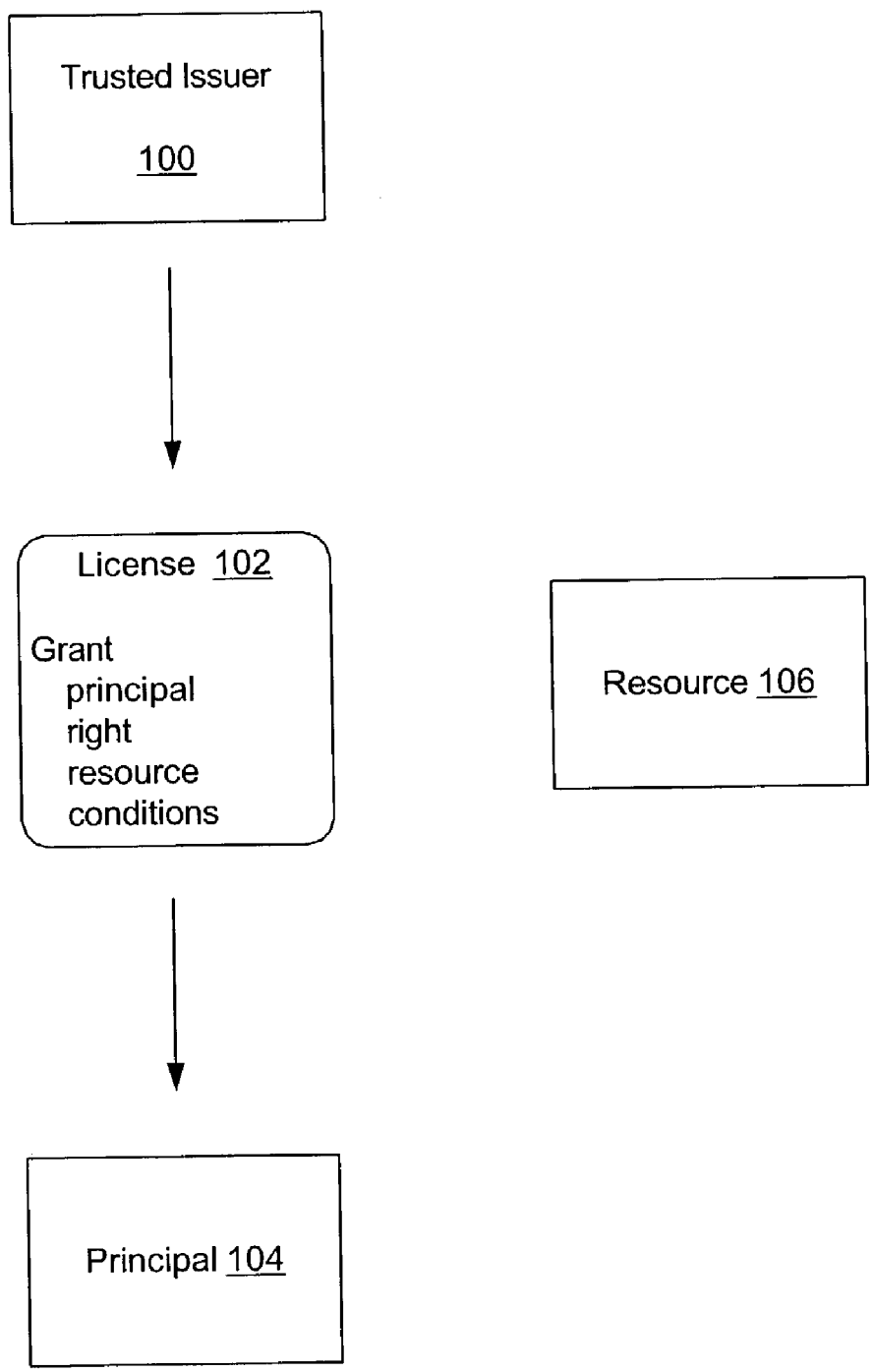
FIGS. 1A and 1B illustrate a prior art mechanism for granting rights to access a resource and a process for determining if two information sets are equal.
Figure 1B:
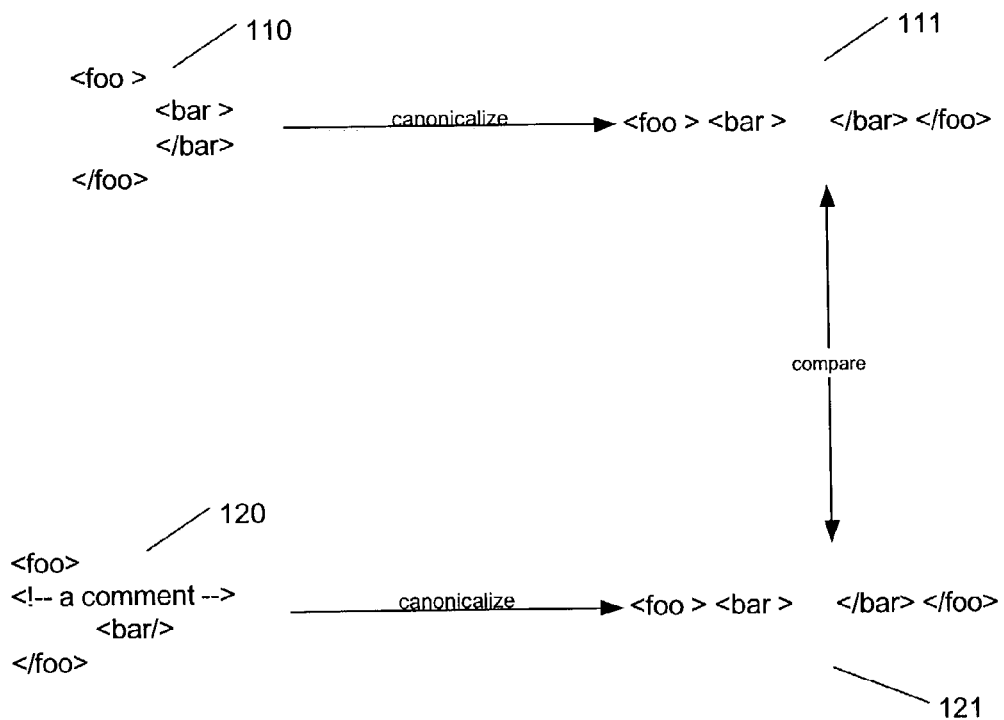

Aspects of the present invention relate to comparing two information sets to determine if they are equal. Considerable flexibility and latitude exists in XML Schema wherein possibly quite different XML infosets are considered to actually convey the same information. These sorts of XML applications are increasingly common, especially as more and more XML architectures exploit the ability for end-users to customize the architecture in extension schemas using the rich mechanisms and infrastructure provided by XML Schema. Using the described system, for example, providers of digital services may compare XML infosets to determine if a user has been granted appropriate rights.

A number of conventional XML terms are used throughout the specification. Unless separately defined, they are intended to have their standard meaning in the art.

Understanding of XML Schema, XPath, and other XML standards is presumed. For the purpose of simplicity, some abbreviations are used throughout this disclosure as follows:

SCC=Schema-Centric Canonicalization
ns=namespace
ln=local name
attrib=attribute

To assist the reader, the following description is divided into sections as follows: general purpose computing environment; schema-centric canonicalization; and equality comparison using schema-centric canonicalization.

General-Purpose Computing Environment

Aspects of the present invention are suitable for use in a distributed computing system environment. In a distributed computing environment, tasks may be performed by remote computer devices that are linked through communications networks. The distributed computing environment may include client and server devices that may communicate either locally or via one or more computer networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

Aspects of the invention will be described in the general context of computer-executable instructions, such as program modules, that are executed by a processing device, including, but not limited to a personal computer. Generally, program modules include routines, programs, objects, components, data structures, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media that can be accessed by a general purpose or special purpose computer.

By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 2:
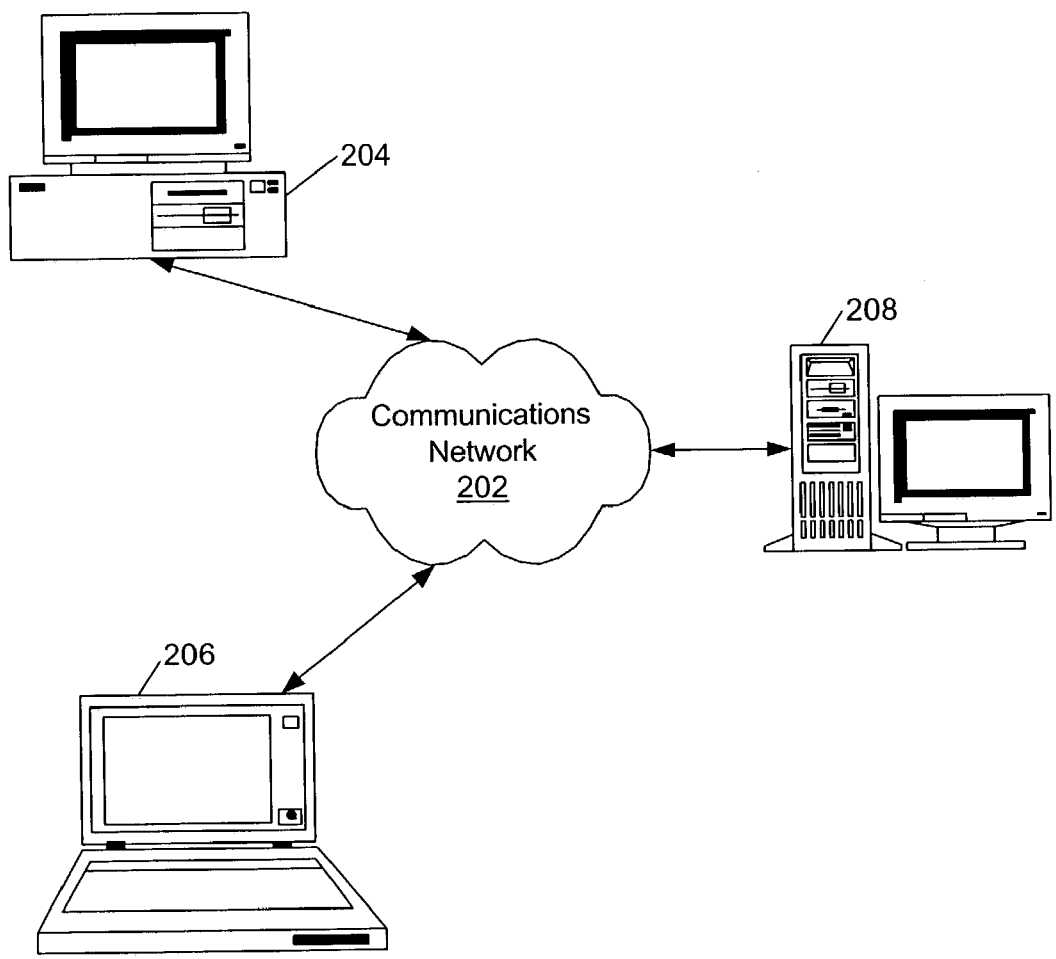
FIG. 2 illustrates an illustrative distributed computing system operating environment in accordance with embodiments of the invention.

FIG. 2 illustrates an example of a suitable distributed computing system 200 operating environment in which the invention may be implemented. Distributed computing system 200 is only one example of a suitable operating environment and is not intended to suggest any limitation as to the scope of use or functionality of the invention. System 200 is shown as including a communications network 202. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services such as the Microsoft Network or America Online's Network. Systems may also include more than one communication network, such as a LAN coupled to the Internet Computer device 204, computer device 206 and computer device 208 may be coupled to communications network 202 through communication devices. Network interfaces or adapters may be used to connect computer devices 204, 206 and 208 to a LAN. When communications network 202 includes a WAN, modems or other means for establishing a communications over WANs may be utilized. Computer devices 204, 206 and 208 may communicate with one another via communication network 202 in ways that are well known in the art. The existence of any of various well-known protocols, such as TCP/IP, Ethernet, FTP, HTTP and the like, is presumed. Computers devices 204, 206 and 208 may exchange content, applications, messages and other objects via communications network 202.

Schema-Centric Canonicalization

In an XML schema, an XML instance document is modeled after the XML Information Set recommendation. This recommendation includes both information items (which are interconnected by a graph) and associated properties. An information item is an abstract description of a part of an XML document. As is traditional, and for purposes of simplicity, the property names are represented in square brackets "[ ]". There are eleven different types of information items as follows:
1. element information items,
2. attribute information items,
3. comment information items,
4. namespace information items,
5. character information items,
6. document information items,
7. processing instruction information items,
8. unexpanded entity reference information items,
9. document type declaration information items,
10. unparsed entity information items, and
11. notation information items.

Properties may be associated with each of these items as is known in the art of object oriented programming. A further description is eliminated. Standard definitions apply.

For example, the representation of an XML document as an infoset is different from its representation as a node-set as defined, for instance, in http://www.w3.org/TR/1999/REC-xpath-19991116#data-model in the Xpath specification. While the two are similar, the following description concentrates on the infoset abstraction, as the infoset abstraction is part of the foundation of the XML Schema.

Figure 3:
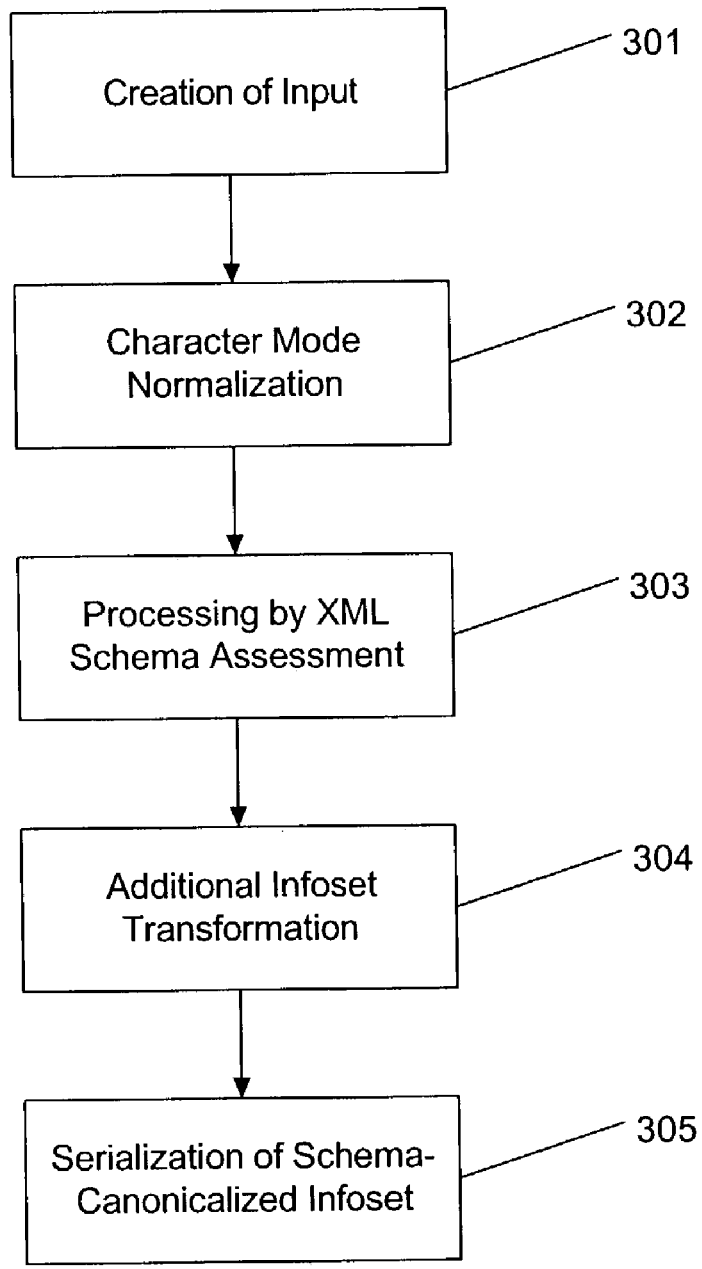
FIG. 3 illustrates a process for schema-centric canonicalization of XML data sets in accordance with embodiments of the invention.

FIG. 3 shows various aspects of the Schema-Centric Canonicalization (SCC) method described herein. The SCC method may be conceptualized in five steps: creation of the input as an infoset in step 301, character model normalization in step 302, processing by XML-Schema assessment in step 303, additional infoset transformation in step 304, and serialization in step 305. These steps are treated in detail under their own subheadings.

Creation of Input 301

The system operates on the XML information to be compared as infosets (standardized information sets as specificed at http://www.w3.org). The system may receive the information to be compared as as infosets or may need to convert the information received into infosets. Two processes for converting non-infoset information into infosets are as follows:
1. If an octet stream is provided, then convert it into an infoset (for example, see http://www.w3.org/TR/2001/REC-xmlschema-1-20010502/#concepts-data-model).
2. If an XPath node-set is provided, then convert it into an infoset.

While these two inputs are defined for conversion, other inputs may be defined as well. Any inputs may be recevied as long as they are converted into an infoset.

In addition to the data itself, the SCC process uses the appropriate XML Schemas available at http://www.w3.org/LTR/2001/REC-xmlschema-1-20010502#kev-schemaand. The XML Schemas provide an indication of the relevant components of to which the received infosets conform. It is expected that the received XML be valid XML. If the received information is not valid, then canonicalization and comparison of the received information sets will fail or produce extraneous results. One standard of validity is found at W3.org as follows: http://www.w3.org/TR/2001/REC-xmlschema-1-20010502#key-vn.

While it is not always the situation that the [in-scope namespaces] property of an element information item in an infoset will be consistent with the [namespace attributes] properties of the item and its ancestors, for the purposes of the SCC process, it is assumed that the relationship exists.

Octet Stream Conversion to an Infoset

If the input to the canonicalization process is an octet stream, then it is to be converted into an infoset by parsing the octet stream as an XML document. One example of this parsing approach is exhibited by software attempting to assess the schema validity of XML data. See http://www.w3.org/TR/2001/REC-xmlschema-1-20010502/#concepts-data-model.

Node-Set Conversion to an Infoset

A node-set may be defined as "an unordered collection of nodes without duplicates." An example of a definition of a node may be found at http://www.w3.org/TR/1999/REC-xpath-19991116#data-model where the XML document is operated on as a tree. The seven types of nodes that may appear in such trees include the following:
1. root nodes
2. element nodes
3. attribute nodes
4. text nodes
5. namespace nodes
6. processing instruction nodes
7. comment nodes The nodes in a given node-set are all the nodes from the underlying tree instance. For example, if N is a node-set, then T(N) is the tree formed from the node set. r(T(N)) is the root node of that tree. The conversion process to an infoset first converts T(N) into an equivalent infoset I(T(N)), then fills in the rest of the infoset with information items that correspond to the nodes of N.

Figure 4A:
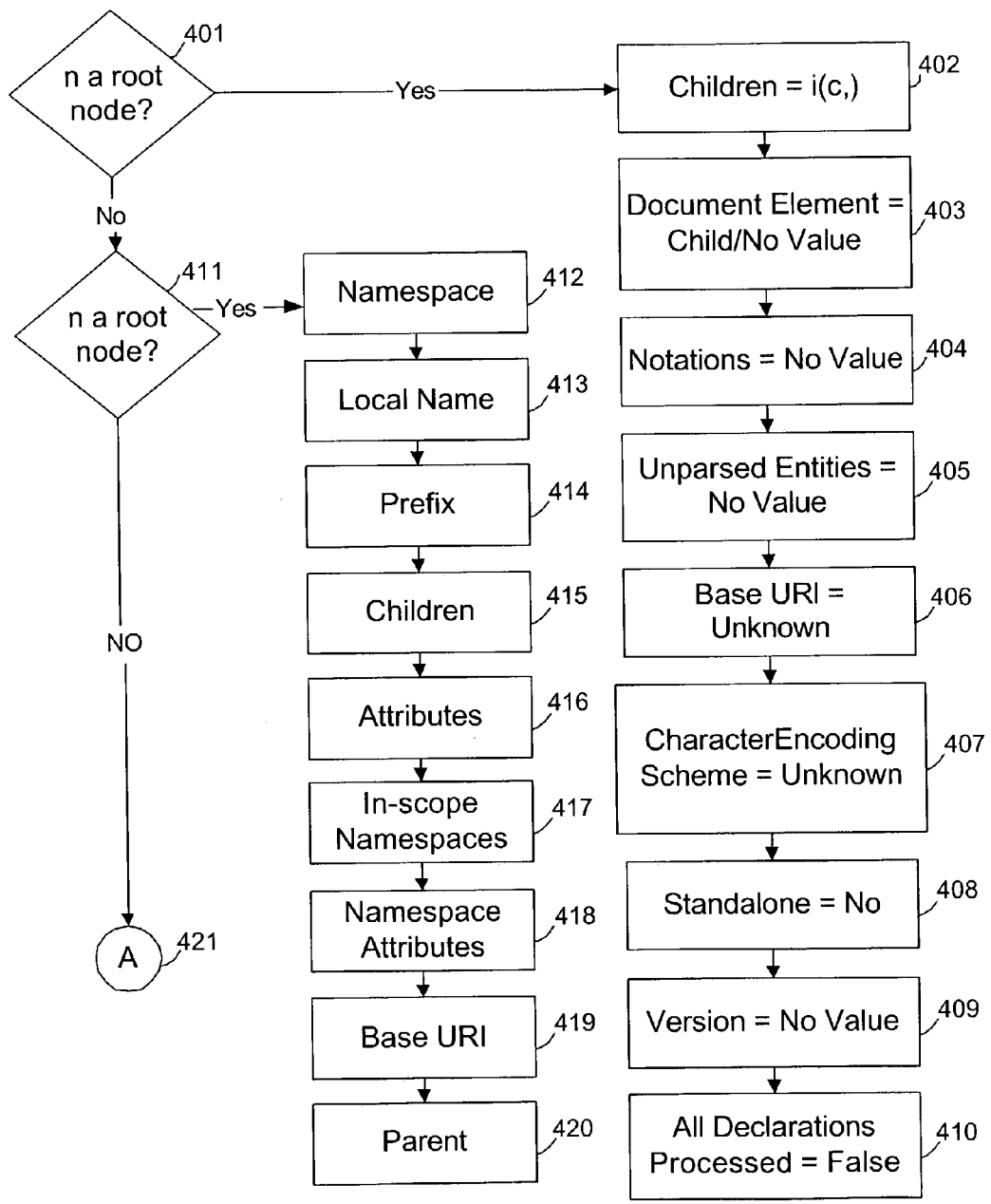
FIGS. 4A and 4B show processes for converting XML data sets into infosets in accordance with embodiments of the invention.

Conversion of an XPath node-tree to an infoset may be implemented recursively in terms of the conversion of individual nodes to corresponding information items. For example, let n be an arbitrary XPath node, and let {n} be a node-set containing just the node n. Let i be the function taking a node as input and returning an ordered list of nodes as output, which is defined as follows and in FIGS. 4A and 4B:

1. If n is a root node from step 401, then i(n) is a single document information item, where:
   a. the [children] property 402 is the ordered list resulting from the concatenation of the lists of information items $i(C_j)$ where $c_j$ ranges over the children of n in document order, excepting that those children of n (if any) contained within the DTD (if one exists; entity declarations, for example, may still usefully be found therein even if XML Schema is used for validation) are excluded.
   b. the [document element] property 403 is either
      i. that member of [children] which results from the conversion of the single child of n which is an element node, if such is present, or
      ii. no value, if such is not present.
   c. the [notations] property 404 has no value.
   d. the [unparsed entities] property 405 has no value.
   e. the [base URI] property 406 is unknown.
   f. the [character encoding scheme] property 407 is unknown.
   g. the [standalone] property 408 has no value.
   h. the [version] property 409 has no value.
   i. the [all declarations processed] property 410 is false.
2. If n is an element node (from step 411), then i(n) is a single element information item, where:
   a. the [namespace name] property 412 is the result of the function invocation namespace-uri({n})
   b. the [local name] property 413 is the result of the function invocation local-name({n})
   c. the [prefix] property 414 is either
      i. the prefix of the QName which is the result of the function invocation name({n}), if such result is not the empty string, or
      ii. no value otherwise.
   d. the [children] property 415 is the ordered list resulting from the concatenation of the lists of information items $i(c_i)$, where $c_i$ ranges over the children of n in document order
   e. the [attributes] property 416 is the unordered set whose members are the collective members of the lists of information items $i(a_j)$, where $a_j$ ranges over those attribute nodes in T({n}) whose parent is n (note that such attribute nodes are not children of n).
   f. the [in-scope namespaces] property 417 is the unordered set whose members are the collective members of the lists of information items $i(n_k)$ (which are by construction namespace information items), where $n_k$ ranges over the set of namespace nodes in T({n}) whose parent is n (note such namespace nodes are not children of n).
   g. the [namespace attributes] property 418 is an unordered set of attribute information items computed as follows. Let Nn be the set of namespace information items in the [in-scope namespaces] property of i(n), and let Np be the set of namespace information items in the [in-scope namespaces] property of i(m), where m is the [parent] of n. For each namespace information item s in Nn-Np (so, each namespace information item newly introduced on i(n)), the [namespace attributes] property contains an attribute information item whose properties are as follows:
      i. the [namespace name] property is (per XML Infoset) "http://www.w3.org/2000/xmlns/"
      ii. the [local name] property is the value of the [prefix] property of s.
      iii. the [prefix] property is "xmlns"
      iv. the [normalized value] property is the value of the [namespace name] property of s.
      v. the remaining properties are as set forth in the attribute node case below.

Conversely, consider each namespace node s in Np-Nn (so, each namespace information item present on the parent but removed on n). The specification of XML Namespaces is such that there can be at most one such s, and that it represent a declaration of the default namespace, which is then undeclared by element i(n). If such an s exists, then the [namespace attributes] property of i(n) additionally contains an attribute information item whose properties are as follows:
      i. the [namespace name] property is "http://www.w3.org/2000/xmlns/"
      ii. the [local name] property is the empty string
      iii. the [prefix] property is "xmln"
      iv. the [normalized value] property is the empty string
      v. the remaining properties are as set forth in the attribute node case below.
   h. the [base URI] property 419 is unknown.
   i. the [parent] property 420 is the document or element information item in the infoset rooted at i(r(T({n}))) which contains this information item in its [children] property.

Figure 4B:
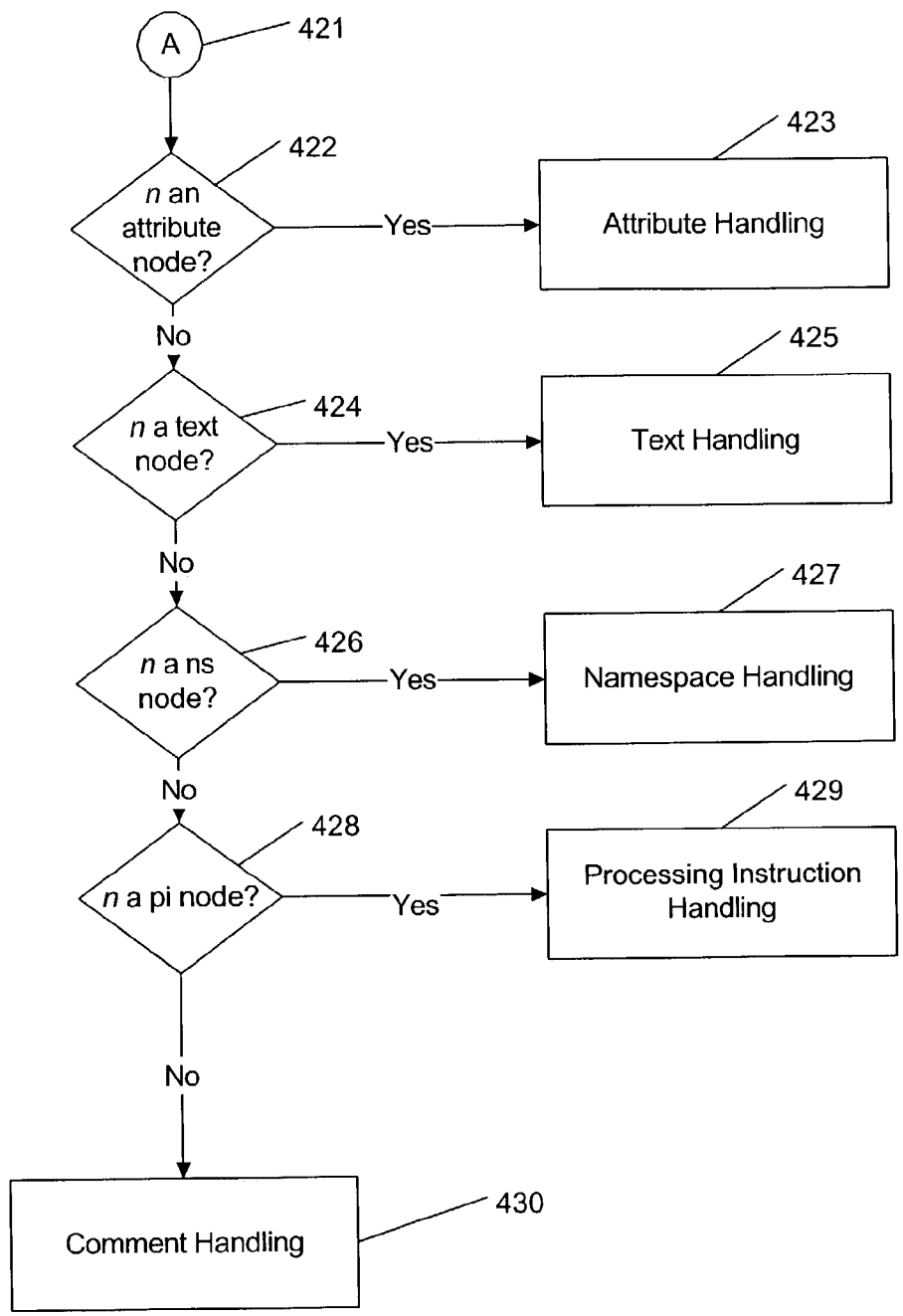

Continued on FIG. 4B, at A 421, the specific propery blocks are combined into the property handling blocks 423, 425, 427, 429, and 430, for simplicity.
3. If n is an attribute node step 422, then i(n) is a single attribute information item, where attribute handling 423 addresses:
   a. the [namespace name] property is the result of the function invocation namespace-uri({n})
   b. the [local name] property is the result of the function invocation local-name({n})
   c. the [prefix] property is either
      i. the prefix of the QName which is the result of the function invocation name({n}), if such result is not the empty string, or
      ii. no value otherwise.
   d. the [normalized value] property is the result of the function invocation string({n})
   e. the [specified] property is unknown.
   f. the [attribute type] property is unknown.
   g. the [references] property is unknown.
   h. the [owner element] property is the element information item in the infoset rooted at i(r(T({n})) which contains this information item in its [attributes] property, if any such element exists, or no value otherwise.
4. If n is a text node 424, then i(n) is an ordered list of character information items, one character information item $c_j$ corresponding to each character in the result of the function invocation string({n}), where text handling 425 addresses:

a. the [character code] property of $c_j$ is the ISO 10646 character code of the corresponding jth character in the result of the function invocation string({n}).
b. the [element content whitespace] property of $c_j$ is
   i. unknown if the character is whitespace, and
   ii. false otherwise.
c. the [parent] property is the element information item in the infoset rooted at i(r(T({n}))) which contains this information item in its [children] property.
5. If n is a namespace node 426, then i(n) is a single namespace information item, where namespace information handling 427 addresses:
   a. the [prefix] property is the result of the function invocation local-name({n}), unless that returns an empty string, in which case the [prefix] property is no value. This perhaps unexpected formulation arises from the fact that in XPath, "a namespace node has an expanded-name: the local part is the namespace prefix (this is empty if the namespace node is for the default namespace); the namespace URI is always null."
   b. the [namespace name] property is the result of the function invocation string({n}).
6. If n is a processing instruction node 428, then i(n) is a single processing instruction information item, where processing instruction handling 429 addresses:
   a. the [target] property is the result of the function invocation local-name({n}).
   b. the [content] property is the result of the function invocation string({n}).
   c. the [base URI] property is unknown.
   d. the [notation] property is unknown.
   e. the [parent] property is the document, element, or document type definition information item in the infoset rooted at i(r(T({n}))) which contains this information item in its [children] property
7. If n is a comment node (resulting from step 428), then i(n) is a single comment information item, where comment handling 430 addresses:
   a. the [content] property is the result of the function invocation string({n}).
   b. the [parent] property is the document or element information item in the infoset rooted at i(r(T({n}))) which contains this information item in its [children] property.

Having defined the function i, additional details are provided for the node-set conversion process. Let N be a node-set, and consider the document information item returned by the function invocation i(r(T(N))). Define the infoset I(T(N)) to be that set of information items which are transitively reachable from i(r(T(N))) through any of the properties defined on any of the information items therein. This infoset represents the conversion of the node tree T(N) into a corresponding infoset.

As the node-set N is a subset of T(N), the relationship may be represented in I(T(N)). To that end, a new boolean infoset property called [omitted] is defined. Unless otherwise indicated by some specification, the value of the [omitted] property of any information item is always to be taken to be 'false'. Here, however, one may define that, for all information items in I(T(N)), the value of [omitted] is 'true' except those items which, for some n in N, are members of the list returned from i(n).

Character Model Normalization 302

The Unicode standard allows diverse representations of certain "precomposed characters" (a simple example is "ç"). Thus, two XML documents with content that is equivalent for the purposes of most applications may contain differing character sequences, which may unnecessasarily foil a comparison process. However, a normalized form of such representations is also defined by the Unicode Standard.

The SCC process uses all input infosets and all schema components transformed by a XML Schema-Assesment process as transforemed as needed into the Unicode Normalized Form C for all string-valued properties and all sequences of character information items.

As a (non-normative) note of implementation, in the case where the to-be-canonicalized XML instance and the XML schema specifications thereof are input to the canonicalization process as physical files, this normalization can usually be most straightforwardly accomplished simply by normalizing the characters of these files first before commencing with the remainder of the canonicalization process.

Processing by XML Schema-Assessment 303

The third step of the SCC process is the transformation of the input infoset into a "post-schema-validation infoset" (the "PSVI"), similar to that defined by the XML Schema Structures recommendation http://www.w3.org/TR/2001/REC-xmlschema-1-20010502/#concepts-schemaConstraints with a few additional points. In XML Schema, as the schema assessment process is carried out, the input infoset is augmented by the addition of new properties that record in the information items various pieces of knowledge which the assessment process has been able to infer. For example, attribute information items are augmented with a [schema normalized value] property (see for example, http://www.w3.org/TR/2001/REC-xmlschema-1-20010502/#a-schema_normalized_value), which contains the result of, among other things, the application of the appropriate schema-specified default-value to the attribute information item (the full list of such augmentation is tabulated in the appendix to XML Schema Structures at http://www.w3.org/TR/2001/REC-xmlschema-1-20010502/#PSVI_contributions).

Once the input infoset is normalized with respect to its character model, the Schema Centric Canonicalization process (SCC) carries out schema assessment by appealing to the third approach listed in §5.2 Assessing Schema-Validity of the XML Schema recommendation and attempting to carry out strict assessment of the element information item which is the value of the [document element] property of the document information item of the infoset.

In XML Schema, as the schema assessment process is carried out, the infoset input to that process is augmented by the addition of new properties, which record in the information items various pieces of knowledge, which the assessment process has been able to discern. For example, attribute information items are augmented with a [schema normalized value] property which contains the result of, among other things, the application of the appropriate schema-specified default-value to the attribute information item.

In the known XML Schema Structures, the augmentation process of schema assessment fails to record a small number of pieces of information which it has learned. To this end, knowledge of these pieces are helpful. The general approach is set forth in §3.8.5 of http://www.w3.org/TR/2001/REC-xmlschema-1-20010502/#section-Model-Group-Information-Set-Contributions. The following modifies the entry as "None as such" to the following:

3.8.5 Model Group Information Set Contributions

If the schema-validity of an element information item has been assessed as per Element Sequence Valid (§3.8.4) (http://www.w3.org/TR/2001/REC-xmlschema-1-20010502/#section-Model-Group-Validation-Rules) by a model group whose {compositor} is all, then in the post-schema-validation infoset it has the following property:

PSVI Contributions for element information items [validating model group all]

An .item isomorphic. to the model group component involved in such assessment.

Additional Infoset Transformation 304

The PSVI output from the XML Schema is next further transformed into a schema-canonicalized infoset to address the following canonicalization issues:

1. The existence of information items in the info set that are completely ignored by the schema assessment process;
2. The existence of the semantically important use of XML namespace prefixes in various embedded languages that are contained strings of the input. For example, an attribute might in fact represent an XPath expression that may internally refer to contextual namespace prefixes. The described approach attempts to desensitize the SCC process from the use of namespace prefixes in embedded languages;
3. The namespaces need to be canonicalized with respect to the namespace prefix declaration used for a given namespace. The overall result is that the output of the described SCC approach is not sensitive to the particular choice of namespace prefixes in its inputs; and,
4. The permitted variability in the representation of simple data types in the XML Schema.

Figure 5:
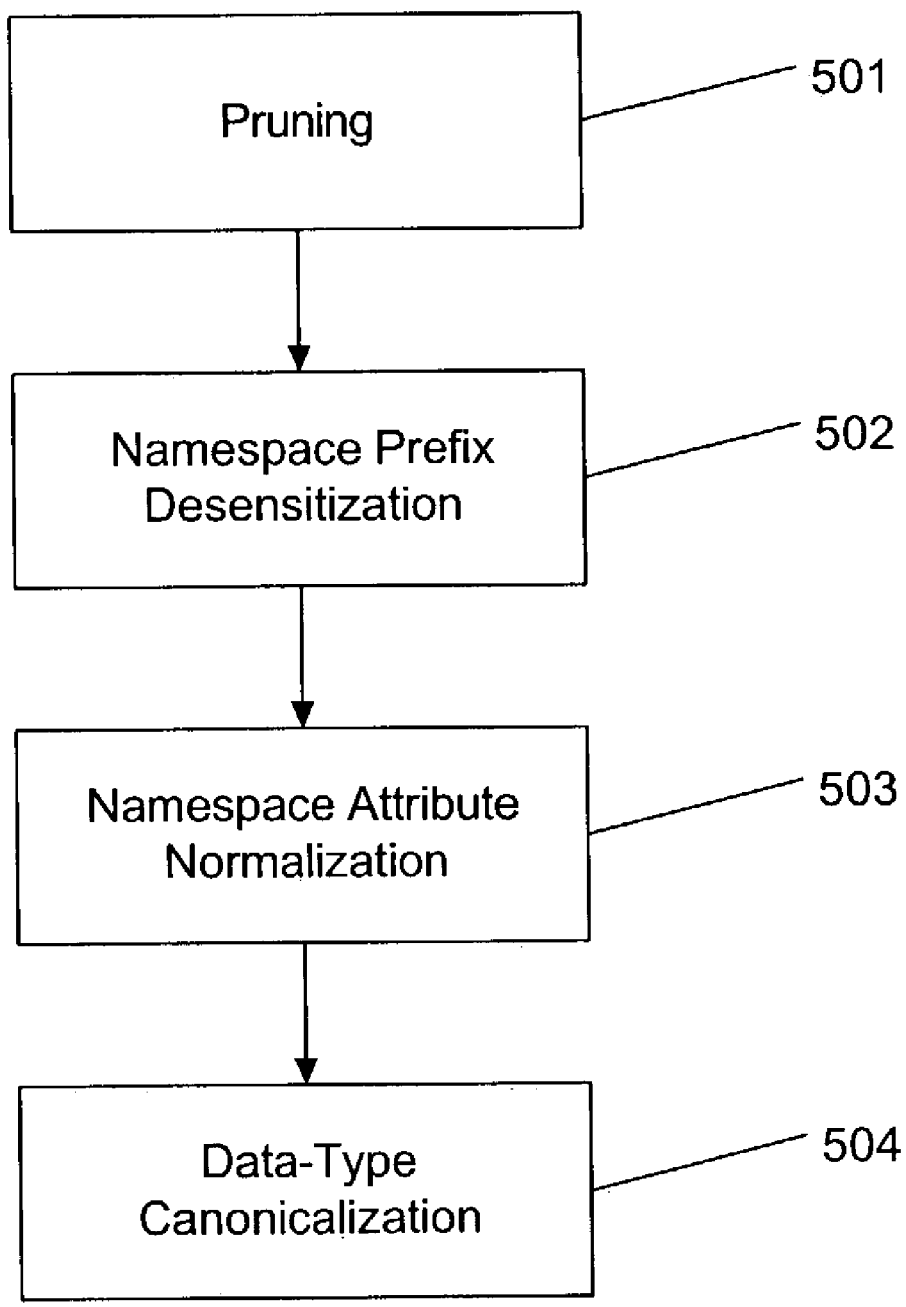
FIGS. 5, 6A, and 6B show additional processing of infosets in accordance with embodiments of the invention.

To address these issues, the following includes four steps to transform the PSVI into the schema-canonicalized infoset as shown in FIG. 5. The four steps include pruning 501, namespace prefix desensitization 502, namespace attribute normalization 503, and data-type canonicalization 504.

Pruning 501

Some information items in the PSVI do not actively participate in the schema assessment process of XML Schema. They are either ignored completely by that process, or used in an administrative capacity which is not central to the outcome. Thus, these items may be pruned from the PSVI in order that they not affect the output of canonicalization. Similarly, declarations of notations and unparsed entities that are not actually referenced in the canonicalized representation may also be removed. Alternatively, these items may remain yet be ignored.

Pruning may be accomplished by the setting the [omitted] property to 'true' for any information item info in the PSVI for which at least one of the following is true:

1. info is a (necessarily whitespace) character information item, which is a member of the [children] of an element information item, whose [type definition] is a complex type schema component, whose {content type} property is element-only;
2. info is an attribute information item, whose [namespace name] is identical to "http://www.w3.org/2001/XMLSchema-instance" and whose [local name] is one of "schemaLocation" or "noNamespaceSchemaLocation;"
3. info is a notation information item for which there does not exist an attribute or element information item in the infoset whose [omitted] property is false, whose [member type definition] (if present) or [type definition] (otherwise) property is either a. a NOTATION simple type (or restriction or extension thereof)

b. a list of same and whose [schema normalized value] is identical (in the former case) or contains a list item which is identical (in the later case) to the [name] of the notation information item;

4. info is an unparsed entity information item for which there does not exist an attribute or element information item in the infoset whose [omitted] property is false, whose [member type definition] (if present) or [type definition] (otherwise) property is either a. an ENTITY simple type (or restriction or extension thereof)

b. a list of same and whose [schema normalized value] is identical (in the former case) or contains a list item which is identical (in the later case) to the [name] of the unparsed entity information item Namespace Prefix Desensitization 502

One of the goals of namespace prefix desensitization is to first identify those information items in the infoset that make use of namespace prefixes outside of XML start and end tags (that is, information of type QName and derivations and lists thereof as well as information representing an expression written in some embedded language that makes use of the XML Namespaces specification in a embedded-language-specific manner). Another is to annotate the infoset in order to indicate exactly where and in what manner uses of particular XML namespace prefixes occur. In other words, desensitization may be represeted by a two-step process: a data location step and an annotation step.

The notion of embedded language used here includes not only languages (such as Xpath) that are represented in XML as the content of certain strings but also those (such as XML Query) which make use of structured element content. In order to be namespace-desensitizeable, all references to XML namespace prefixes should lie in information identified as being of a simple type (usually strings). However, these prefixes may be found in simple types that are attributes and/or the content of elements perhaps deep in the sub-structure of the element rooting the occurrence of the embedded language.

Further, the semantics of each embedded language should not be sensitive to the specific namespace prefixes used, or the character-count length thereof. One should be permitted to consistently rewrite any or all of the prefixes used in an occurrence of a language with arbitrary other appropriately declared prefixes, possibly of different length, without affecting the semantic meaning.

Each particular embedded language for which namespace desensitization is to be done should be identified by a name assigned to it by an appropriate authority. The assigned name should be of the data-type "anyURI." At least two URIs may be used as names of particular embedded languages:

http://www.w3.org/TR/1999/REC-xpath-19991116
  where the embedded language consists of sequences of characters which conform to the any of the grammatical productions of the XPath 1.0 specification; and, http://www.w3.org/2001/XMLSchema
  where the embedded language consists of sequences of characters which are of type QName or derivations and/or lists (and their derivations) thereof.

The data location step of desensitization makes use of canonicalization-specific annotations to XML Schema components. In XML Schema, the XML representation of all schema components allows the presence of attributes qualified with namespace names other than the XML Schema namespace itself. This is shown as a schema-for-schema shown by the presence of the following definition:

```
<xs:anyAttribute namespace="##other"
    processContents="lax"/>
```

This definition may be used for each of the various schema components. These attributes are represented in the infoset representation of the schema inside the {attributes} property of an annotation schema component, which in turn is the value of the {annotation} property of the annotated schema component in question (i.e.: the annotation is the {annotation} of the attribute declaration, the element declaration, or the like).

Within the namespace for the SCC, a few attributes may be defined for use as annotations to schema components:

1. The embeddedLang attribute, which is of type anyURI, is defined in the SCC process namespace. When used as an attribute annotation to a schema component, an embeddedLang attribute indicates that an information item that validates against the schema component in question in fact contains information written in a certain, fixed embedded language, whose name is indicated in the value of the embeddedLang attribute;
2. The embeddedLang attribute may also be used within a schema instance (when permitted by the corresponding schema). This is similar to how the xsi:type attribute may be used. In such situations, the [owner element] of the embeddedLang attribute contains information written in a certain, fixed embedded language, whose name is indicated in the value of the embeddedLang attribute. The use of an embeddedLang attribute in a schema instance supercedes any identification of embedded language that may be provided by its schema.

Figure 6A:
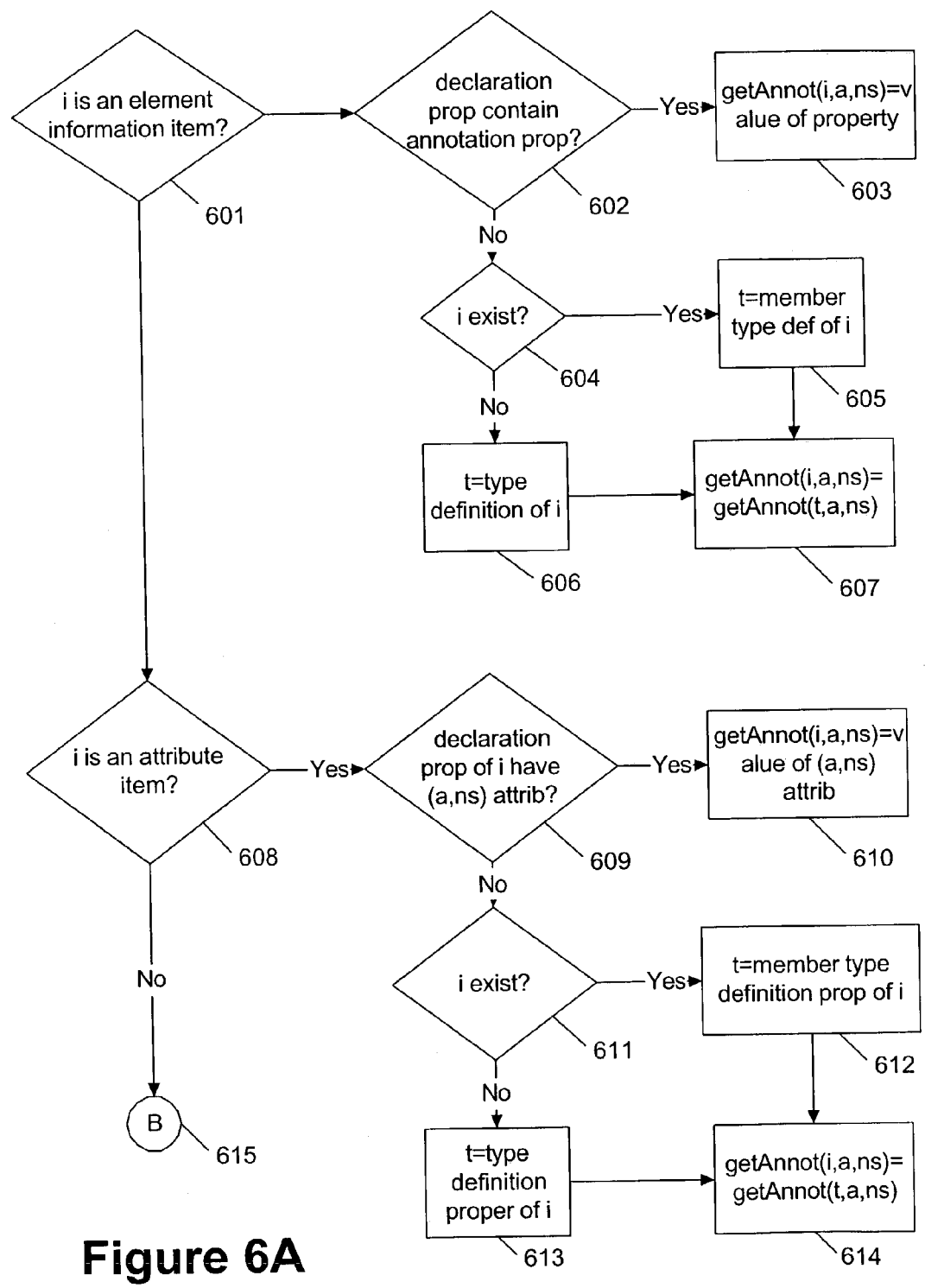
Figure 6B:
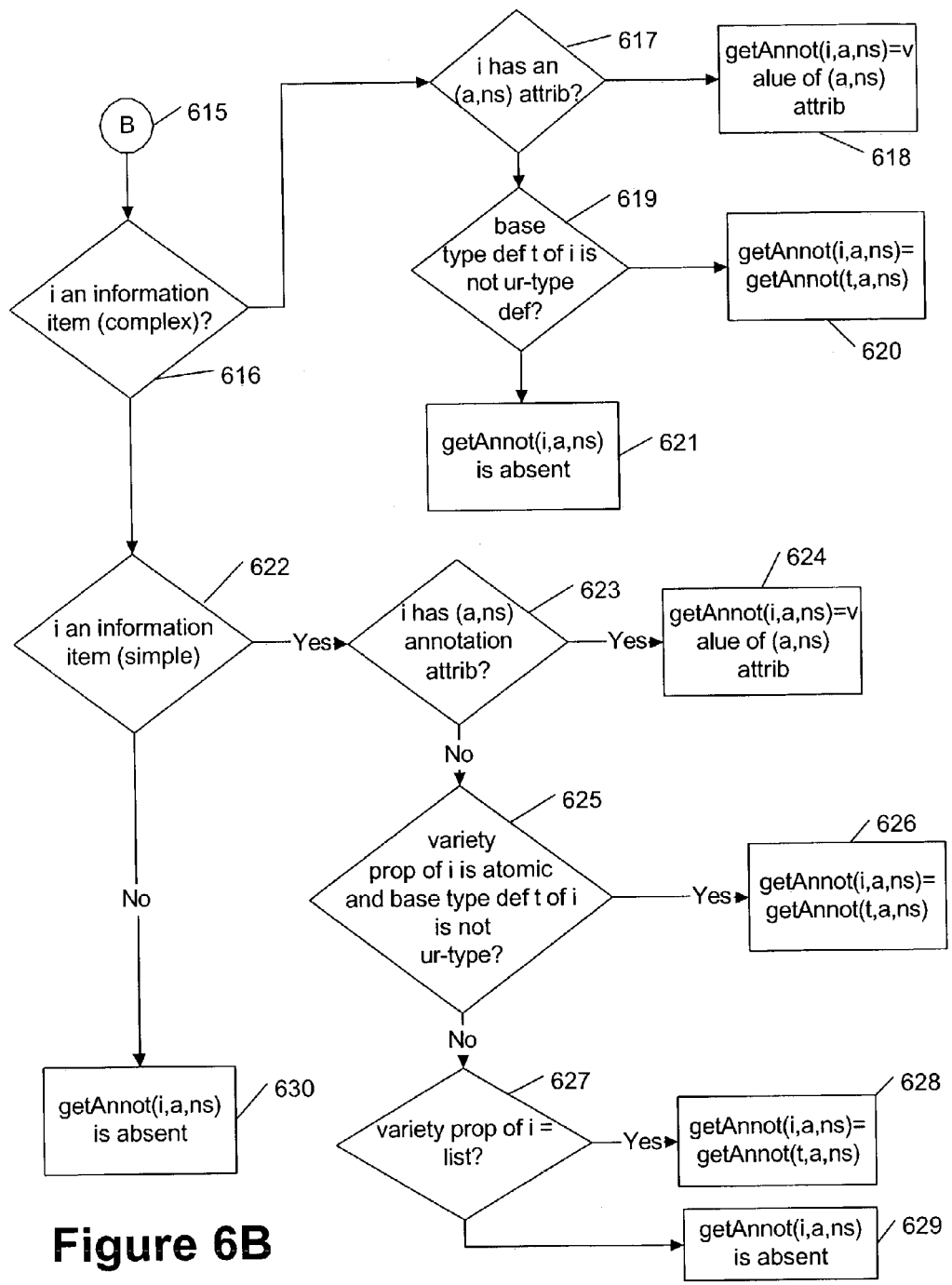

In order to specify how these attributes are used, an auxiliary function may be defined in order to model the inheritance of annotations in schemas from types to elements and attributes and from base types to derived types. The following is shown in FIGS. 6A and 6B. Let i be an information item, a be a string (representing the name of an attribute), and ns be either a URI (representing the name of an XML namespace) or the value absent. Define the function getAnnot(i, a, ns) as follows:

1. If i is an element information item (step 601), then
   a. If the [element declaration] property of i contains in its {annotation} property an Annotation schema component which contains in its {attributes} property an attribute information item whose {name} is a and whose {target namespace} is ns (that is, if the [element declaration] property of i "has an (a,ns) annotation attribute") (step 602), then getAnnot(i, a, ns) is the value of that attribute (step 603);
   b. Otherwise, if i exists (step 604), then let t be the [member type definition] property of i (step 605). Otherwise, t is the [type definition] property of i (step 606). Then getAnnot(i, a, ns) is getAnnot(t, a, ns) in step 607.
2. If i is an attribute information item (in step 608), then
   a. If the [attribute declaration] property of i has an (a,ns) annotation attribute in step 609, then getAnnot (i, a, ns) is the value of that attribute (step 610).
   b. Otherwise, if i exists (step 611), then t is the [member type definition] property of i (step 612) or the [type definition] property of i (otherwise, step 613). Then getAnnot(i, a, ns) is getAnnot(t, a, ns) (step 614).

Continuing through node 615 on FIG. 6B,

3. If i is an information item (step 616), which is item isomorphic to a complex type definition schema component, then,
   a. If i has an (a,ns) annotation attribute (step 617), then getAnnot(i, a, ns) is the value of that attribute (step 618);
   b. If the {base type definition} property t of i is not the ur-type definition (step 619), then getAnnot(i, a, ns) is getAnnot(t, a, ns) (step 620);
   c. Otherwise, getAnnot(i, a, ns) is absent in step 621.
4. If i is an information item, which is item isomorphic to a simple type definition schema component (step 622) then,
   a. If i has an (a,ns) annotation attribute (step 623), then getAnnot(i, a, ns) is the value of that attribute (step 624).
   b. If the {variety} property of i is atomic and if the {base type definition} property t of i is not the ur-type definition (step 625), then getAnnot(i, a, ns) is getAnnot(t, a, ns) (step 626);
   c. If the {variety} property of i is list (step 627), then getAnnot(i, a, ns) is getAnnot(t, a, ns), where t is the {item type definition} property of i (step 628).
   d. Otherwise, getAnnot(i, a, ns) is absent (step 629).
5. Otherwise, getAnnot(i, a, ns) is absent (step 630).

Figure 7:
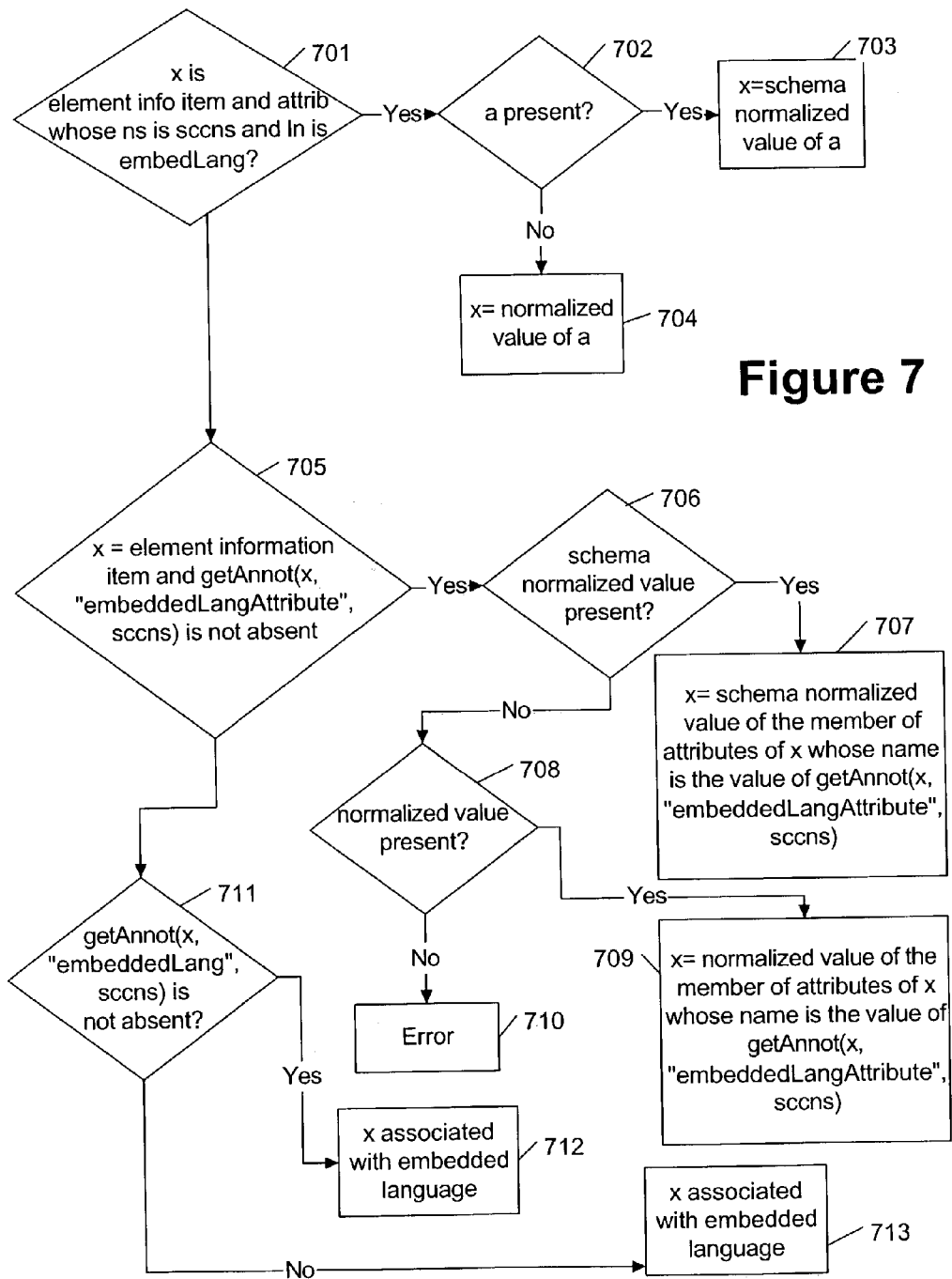
FIG. 7 shows a process for data location in the desensitizing step of FIG. 5 in accordance with embodiments of the invention.

The data location step of desensitization is carried out as FIG. 7. Let SCCns be the SCC namespace. Each attribute and element information item x in the pruned PSVI is considered in turn:

1. If x is an element information item and if the [attributes] of x contain an attribute a whose [namespace name] is SCCns and whose [local name] is "embeddedLang" step 701, then, if a is present (step 702), x is identified as being associated with the embedded language which is the value of the [schema normalized value] of a (step 703). Otherwise, x is identified as being associated with the [normalized value] of a (step 704).
2. Otherwise, if x is an element information item and if getAnnot(x, "embeddedLangAttribute", SCCns) is not absent (step 705), then, if the [schema normalized value is present (step 706), then x is identified as being associated with the embedded language which is the [schema normalized value] of the member of the [attributes] of x whose name is the value of getAnnot(x, "embeddedLangAttribute", SCCns) (step 707). If the normalized value exists, x is identified as being associated with the embedded language which is the [normalized value] of the member of the [attributes] of x whose name is the value of getAnnot(x, "embeddedLangAttribute", SCCns) (step 708). If no such member of [attributes] exists (step 709), an error occurs (step 710).

3. If getAnnot(x, "embeddedLang", SCCns) is not absent (step 711), then x is identified as being associated with the embedded language which is the value thereof (step 712).
4. Otherwise, x is not associated with any embedded language by means of the embeddedLang or embeddedLangAttribute attributes (step 713), though such an association may be indicated by another process, such as by fiat in some specification.

In regards to the last step, a schema component representing any of the following:

1. the type of the element named "XPath" contained in elements of type dsig:TransformType (where the prefix "dsig" is bound to the XML Signature Syntax and Processing namespace: http://www.w3.org/2000/09/xmldsig#), or
2. the "xpath" attribute whose [owner element] is the element xsd:selector (where the prefix "xsd" is bound to the XML Schema namespace: http://www.w3.org/2001/XMLSchema), or
3. the "xpath" attribute whose [owner element] is the element xsd:field (where the prefix "xsd" is bound as before)

may be considered by definition as possessing an embeddedLang attribute with value http://www.w3.org/TR/1999/REC-xpath-19991116 in the {attributes} property of its {annotation} property (that is, they are by definition annotated as being XPath 1.0 expressions).

Moreover, any attribute or element information item whose [member type definition] (if present) or [type definition] (otherwise) property is any of:

1. QName or a derivation thereof;
2. a list of QName or a derivation thereof; and,
3. a derivation of a list of QName or a derivation thereof is identified as being associated with the embedded language whose name is http://www.w3.org/2001/XMLSchema.

Other specifications may provide similar legacy-supporting definitions when appropriate. Not identifying an embedded language can have negative effects. One example is that the canonicalized output likely be non-operational due to dangling or erroneously-bound namespace prefixes.

Following the data location step, the processing of the attribute and element information items identified as being associated with embedded languages is carried out by the annotation step of namespace prefix desensitization. This may be done in an embedded-language-specific manner. Implementations of the SCC process understand the syntax and perhaps some semantics of each of the embedded languages whose uses they encounter as it performs canonicalization. Should an embedded language which is not appropriately understood be encountered, the SCC process terminates with an error. Thus, to result in a robust canonicalization, the SCC process should fully understand the embedded languages. Examples of languages include Xpath identified as http://www.w3.org/TR/1999/REC-xpath-19991116 as well as the embedded language identified as http://www.w3.org/2001/XMLSchema.

The execution of the annotation step is found in the augmented PSVI in a uniform manner. Specifically, let x be an attribute or element information item which is identified by the language-specific processing as containing one or more uses of XML namespace prefixes in its [schema normalized value] property y. If any of these uses of XML namespace prefixes in y is in a form other than a occurrence of a QName, then an error occurs. Otherwise, x is additionally augmented by the language-specific processing with a [prefix usage locations] property which contains, corresponding to the sequence of all the QNames in y, an ordered sequence of one or more triples (offset, prefix, namespace URI) with the following conditions:

1. offset is the zero-based offset from the start of y of the first character of a QName
2. prefix is the string value of the prefix of that QName (not, to be clear, including any trailing colon), if any is present, or no value otherwise.
3. namespace URI is the in-scope binding of the that XML namespace prefix (or the default XML namespace, if prefix is no value), or no value if no such binding exists (which necessarily must result from a use of the default XML namespace prefix in a context where no declaration for that prefix is in scope), and these triples occur in increasing order by offset.

Namespace Attribute Normalization 503

The next step in the series of infoset transformations carried out by the SCC process is that of normalizing the actual XML namespace prefix declarations in use. The XML namespace recommendation allows namespaces to be multiply declared throughout an XML instance, possibly with several and different namespace prefixes used for the same namespace. In the canonical representation, this flexibility is removed, declaring each namespace just as needed, and using a deterministically constructed namespace prefix in such declaration. This procedure is related to the approach used by the Exclusive XML Canonicalization recommendation. Some definitions are provided:

Ancestor Information Item

An ancestor information item a of an information item i in an infoset is any information item transitively reachable from i through traversal of the [parent] properties of element, processing instruction, unexpanded entity reference, character, comment, and document type declaration information items, and the [owner element] property of attribute information items. Notation, unparsed entity, and namespace information items have no ancestors, nor do attribute information items which appear in elements other than in their [attributes] properties. The information item i is not an ancestor of itself.

Self-Ancestor

A self-ancestor of an information item is either the information item itself or an ancestor thereof.

Output Parent

The output parent of an information item i in an infoset is (noting that the ancestor relationship is transitive) the nearest ancestor of i which is an element information item whose [omitted] property is false, or no value if such an ancestor does not exist.

Visibly Utilize

An element information item e in an infoset is said to visibly utilize an XML namespace prefix p if any of the following is true:

1. the [prefix] property of e is identical to p (note that this includes the case where both are no value),
2. e has a [prefix usage locations] property, and that property value contains some triple whose prefix member is identical top,
3. there exists an attribute information item a in the infoset whose [owner element] property is e, whose [omitted] property is false, and either
   a. the [prefix] property of a is identical to p,
   b. a has a [prefix usage locations] property, and that property value contains some triple whose prefix member is identical to p.

The execution of the namespace attribute normalization step adds [normalized namespace attributes] properties to certain element information items in the infoset. Let e be any element information item whose [omitted] property is false. Then the [normalized namespace attributes] property of e is that unordered set of attribute information items defined recursively as follows.

Let Ne be the set of all namespace information items n in the [in-scope namespaces] property of e where n is visibly utilized by e. Let NAp be the set of attribute information items in the [normalized namespace attributes] property of any self-ancestor of p, where p is the output parent of e and if p is not no value, or the empty set if no such output parent exists. Let namespaces(Ne) be the set of strings consisting of the [namespace name] properties of all members of Ne, and let namespaces(NAp) be the set of strings consisting of the [normalized value] properties of all members of NAp.

For each namespace URI u in namespaces(Ne)-namespaces(NAp) (so, the name of each namespace with a prefix newly utilized at e), the [normalized namespace attributes] property of e contains an attribute information item whose properties are as follows:

1. the [namespace name] property is (per XML Infoset) "http://www.w3.org/2000/xmlns/";
2. the [local name] property is a string of the form "n" concatenated the canonical lexical representation of a non-negative integer i (for example "n0", "n1", "n2", and so on) where the particular integer i in question is chosen as described just below;
3. the [prefix] property is "xmlns";
4. the [normalized value] property is the value u;
5. the [schema normalized value] property is identical to the [normalized value] property; and
6. the remaining properties are as set forth above in the specification of conversion of attribute nodes to information items.

XML namespace prefixes used in the [normalized namespace attributes] property (which are manifest in the [local name] properties of the attribute information items contained therein) are chosen as follows. Let e be any element containing a [normalized namespace attributes] property. Let l be the ordered list resulting from sorting the [normalized namespace attributes] property of e according to the sort function described below. Let k be the maximum over all the ancestors a of e of the integers used per (b) above to form the [local name] property of any attribute item in the [normalized namespace attributes] property of a, or −1 if no such attribute items exist. Then the attributes of l, considered in order, use, in order, the integers k+1, k+2, k+3, and so on in the generation of their [local name] as per (b) above, excepting only that if wildcardOutputRoot(e) is true, then (in order to avoid collisions) any integer which would result in a [local name] property which was the same as the [prefix] property of some namespace item in the [in-scope namespaces] property of e is skipped.

Figure 8:
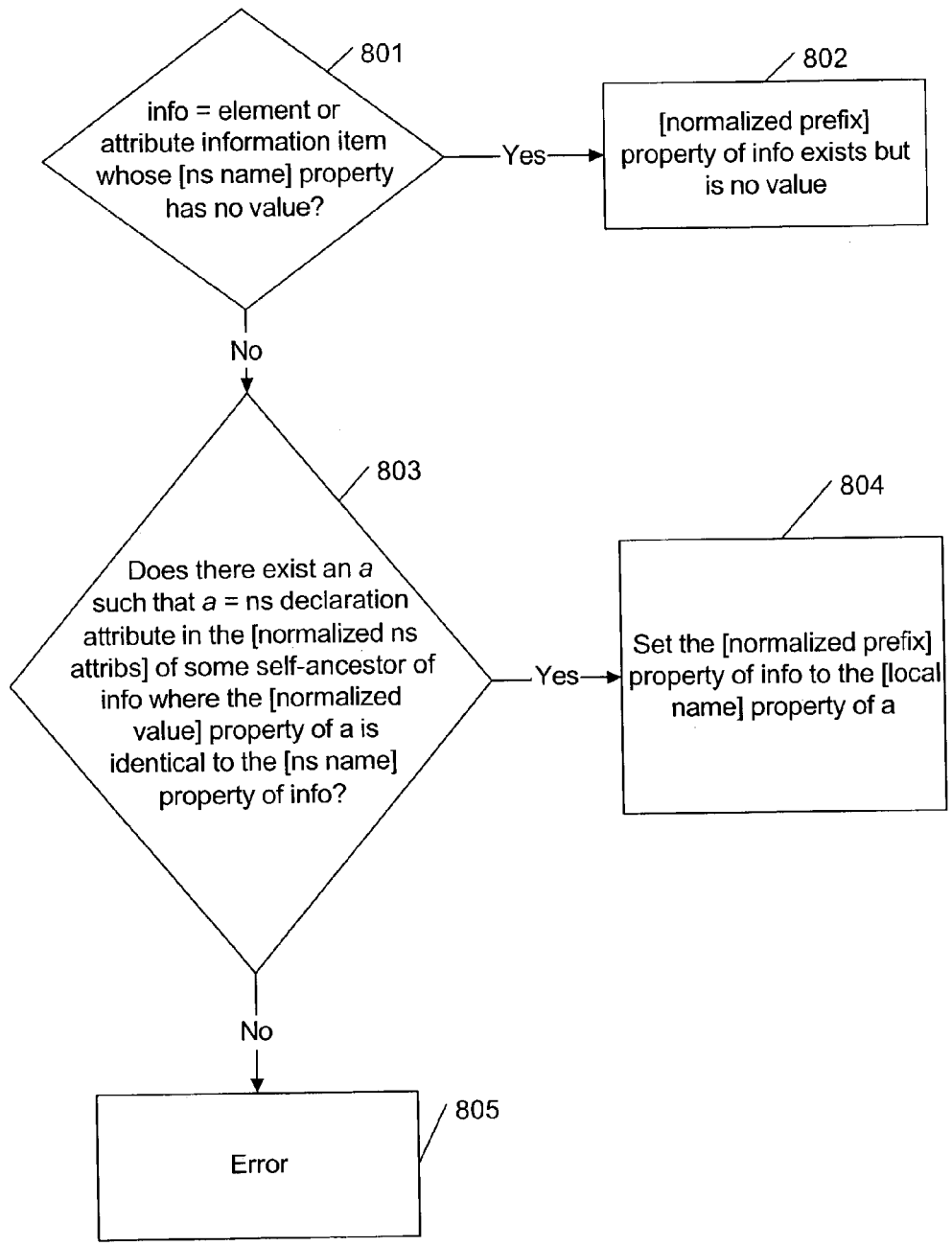
FIG. 8 shows part of a process for namespace attribute normalization in accordance with embodiments of the invention.

At this point, the namespace attributes have been normalized (and, necessarily, the default namespace has been left undeclared), these declarations may be applied in the appropriate places by defining appropriate [normalized prefix] and [prefix & schema normalized value] properties. For example, let info be any information item in the infoset, whose [omitted] property is false. Then the follow apply as shown in FIG. 8:

1. If info is an element or attribute information item whose [namespace name] property has no value (step 801), then the [normalized prefix] property of info exists but is no value (step 802); and,
2. If info is an element or attribute information item whose [namespace name] property is not no value (the no branch of step 801, then the system determines if there exists (step 803) a namespace declaration attribute (call it a) such that a is that that namespace declaration attribute in the [normalized namespace attributes] of some self-ancestor of info where the [normalized value] property of a is identical to the [namespace name] property of info (step 804). If no such a exists, an error occurs in step 805. (this can occur, for example, if all element information items in the infoset are omitted, but some attributes are retained.); otherwise the [normalized prefix] property of info then defined to exist and is set to the value of the [local name] property of a.

Moreover, if info contains a [prefix usage locations] property, then info also contains a [prefix & schema normalized value] property, which is identical to the [schema normalized value] property of info except for differences formed according to the following procedure. Consider in turn each triple t found in the [prefix usage locations] property of info. Let normalizedPrefixUse(t) be those characters of the [prefix & schema normalized value] property of info which correspond to the characters of the [schema normalized value] property of info whose zero-based character-offsets lie in the semi-open interval [offset, offset+cch−1+z), where 1. offset is the offset member of t,
2. cch is the number of characters in the prefix member of t (if prefix is not no value) or zero (otherwise), and
3. z is one if prefix is not no value and the offset+cch−1+1'st character of the [schema normalized value] of info property is a colon, and zero otherwise.

Then the characters of normalizedPrefixUse(t) are determined as follows:

1. If the namespace URI of t has no value, then normalizedPrefixUse(t) is the empty string.
2. Otherwise, let a be that namespace declaration attribute in the [normalized namespace attributes] of some self-ancestor of info where the [normalized value] property of a is identical to the namespace URI of t (if no such a exists, an error occurs). Then normalizedPrefixUse(t) is the [local name] of a followed by a colon.

Data-Type Canonicalization 504

The XML Schema Datatypes specification defines for a certain set of its built-in data-types a canonical lexical representation of the values of each of those data types. To that identified set of canonical representations, the described SCC process adds some new rules. In some cases, the SCC process refines those rules provided by XML Schema.

One difficult aspect of data type canonicalization relates to character sequences that are, as a matter of application-level schema design, considered to be case insensitive. Adding case-insensitivity of application data may be added into the SCC process. If it is not integrated, then applications may be forced to remember the exact case used for certain data when they otherwise would not need to remember the exact case for the data.

The relevant technical reference for case-mapping considerations for Unicode characters is a technical report published by the Unicode Consortium. Case-mapping of Unicode characters can be subtle. The mapping process can at times be both locale-specific (Turkish has special considerations, for example) and context-dependent (some characters case-map differently according to whether they lie at the end of a word or not). Mapping of case can change the length of a character sequence. Upper and lower cases are not precise duals: there exist pairs of strings which are equivalent in their upper case-mapping but not in their lower case, and visa versa.

In order to accommodate these flexibilities, several attributes within the SCC process namespace are defined to assist with the identification of data, which is to be considered case-insensitive, and the precise manner in which that is to be carried out. As was the case for the embeddedLang and embeddedLangAttribute attributes previously defined, these attributes are intended to be used as annotations of relevant schema components. The attributes may be defined as follows:

1. The caseMap attribute, which is of type language, is defined in the SCC algorithm namespace. When used as an attribute annotation to a schema component, a caseMap attribute indicates that case-mapping is to be performed on data which validates against the schema component according to the case-mapping rules of the fixed locale identified by the value of the attribute.
2. The caseMapAttribute attribute, which is of type QName, is defined in the SCC algorithm namespace. When used as an attribute annotation to a schema component, a caseMapAttribute attribute indicates that an information item which validates against the schema component in question is to be case mapped during the canonicalization process according to the rules of the locale which is dynamically indicated in the information item (necessarily an element information item) as the value of a certain attribute thereof, namely the attribute whose qualified name is indicated in the value of the caseMapAttribute attribute (which must be of type language or a restriction thereof).
3. The caseMapKind attribute, which is of type string but restricted to the enumerated values "upper", "lower", and "fold", is defined in the SCC algorithm namespace. When used as an attribute annotation to a schema component, a caseMapKind attribute indicates whether upper-case or lower-case mapping or case-folding is to be carried out as part of the canonicalization process. If this attribute is contextually absent but at least one of caseMap or caseMapAttribute is contextually present, upper-case mapping is carried out.

Traditional ASCII-like case insensitivity can be most easily approximated by simply specifying "fold" for the caseMapKind attribute and omitting both caseMap and caseMapAttribute. Schema designers may need to be aware when combining case-mapping annotations together with length-limiting facets of strings and URIs, due to the length-adjustment that may occur during canonicalization.

The data-type canonicalization step of SCC may be carried out according to the following rules:

1. Per the relevant clarification E2-9 in the errata to XML Schema, the canonical lexical representation of a datum of type base64Binary should conform to the grammatical production Canonical-base64Binary as defined therein. That production permits in the representation only valid base64 encodings which only contain characters from the base64 alphabet as defined by section "6.8 Base64 Content-Transfer-Encoding" of RFC 2045 (in particular, whitespace characters are not in the alphabet), excepting only that the representation is to be formed into lines of exactly 76 characters (except for the last line, which must be 76 characters or shorter) by the appropriate periodic occurrence of a line-feed character (that is, the character whose character code is (decimal) 10) at the end of each line (including the last).
2. The canonical lexical representation of a datum of type dateTime permits only the lexical representation 00:00:00 to denote a time value of midnight (that is, the representation 24:00:00 is prohibited). Further (per XML Schema) either the time zone must be omitted or, if present, the time zone must be Coordinated Universal Time (UTC) indicated by a "Z".
3. The canonical lexical representation of a datum of type float or double is defined by prohibiting certain options from the lexical representation. Specifically, the exponent is indicated by "E". Leading zeroes and the preceding optional "+" sign are prohibited in the exponent. For the mantissa, the preceding optional "+" sign is prohibited and the decimal point is required. For the exponent, the preceding optional "+" sign is prohibited. Leading and trailing zeroes are prohibited subject to the following: number representations must be normalized such that there is a single digit to the left of the decimal point and at least a single digit to the right of the decimal point such that the number of of leading zeros in the overall sequence of such digits is a small as otherwise possible.
4. The canonical lexical representation of a datum of type language permits only the use of upper case characters.
5. The canonical lexical representation of a datum of type gYearMonth and gYear prohibits the use of leading zeros for values where the absolute value of the year in question is outside the range of 0001 to 9999.
6. The canonical lexical representation of an element or attribute information item info which of type string or anyUri or a restriction thereof and where either of the following is true:
   a. the following is true
      i. getAnnot(info, "caseMap", SCCns) is present, or, if not
      ii. getAnnot(info, "caseMapAttribute", SCCns) is present
   b. getAnnot(info, "caseMapKind", SCCns) is present is the result of the application of the function caseMap with the parameters
   c. the sequence of characters comprising the value of the element or attribute in question,
   d. the language indicated according to the applicable case i. or ii. above, if any, or the value absent otherwise,
   e. getAnnot(info, "caseMapKind", SCCns).
7. If none of the preceding rules apply, the canonical lexical representation of a datum of primitive type for which XML Schema Datatypes defines a canonical lexical representation is the representation defined therein.
8. If none of the preceding rules apply, the canonical lexical representation of a datum which is of a primitive type is the not-further-processed representation of the datum itself.
9. The canonical lexical representation of a datum of a type which is derived by list is that which is defined by the XML Schema Datatypes specification (note that this includes the collapsing of the whitespace therein).
10. If none of the preceding rules apply, the canonical lexical representation of a datum which is of a simple type that is a restriction of a type for which a canonical lexical representation is defined is the representation of the datum according to the canonical lexical representation so defined for that base type.

Thus, a canonical lexical representation for all non-union simple types is defined.

The function caseMap takes three input parameters:
1. a sequence of characters whose case is to be mapped,
2. a locale in the form of a language in whose context the mapping is to be carried out, or the value absent, which is to be treated as if "en" were provided,
3. either the string "upper", the string "lower", the string "fold", or the value absent, indicating whether uppercase or lower-case mapping or casefolding is to be carried out; the value absent is treated as if "upper" were provided.

The upper-case or lower-case mapping process of the caseMap function is carried out in the context of the indicated locale according to the (respectively) UCD_upper( ) or UCD_lower( ) functions as specified by the Unicode Consortium. The case-folding process is carried out by mapping characters through the CaseFolding.txt file in the Unicode Character Database as specified by the Unicode Consortium.

To carry out the data-type canonicalization step in the SCC algorithm, the [schema normalized value] property of all element and attribute information items in the output of the namespace attribute normalization step, whose [member type definition] (if present) or [type definition] (otherwise) property is a simple type, is replaced by the defined canonical lexical representation of the member of the relevant value space, which is represented by the [schema normalized value].

The infoset which is output from the data-type canonicalization step is the schema-canonicalized infoset.

Serialization of the Schema-Canonicalized Infoset 305

Finally, the schema-canonicalized infoset is serialized into an XML text representation in a canonical manner. This serialization forms the output of the process as shown in FIG. 3.

The output of the SCC process, whose input is the infoset of an entire XML document, is well-formed XML. However, if some items in the infoset are logically omitted (that is, their [omitted] property is true), then the output may or may not be well-formed XML, depending on exactly which items are omitted (consider, for example, omitting some element information items but retaining their attributes). However, since the canonical form may be subject to further XML processing, most infosets provided for canonicalization will be designed to produce a canonical form that is a well-formed XML document or external general parsed entity. Note that the SCC process shares these issues of well-formedness of output with the existing canonicalization processs.

In such cases where the output of the SCC process is well-formed, then the canonicalization process is idempotent: if x is the input infoset, and C represents the application of the SCC process, then C(x) is identical to C(C(x)). Moreover, in such cases C(x) is valid with respect -to the same schema component(s) as is x (modulo the character sequence length issue noted in the next section).

In the description of the serialization process that follows, at various times a statement is made to the effect that a certain sequence of characters is to be emitted or output. In all cases, it is to be understood that the actual octet sequences emitted are the corresponding UTF-8 representations of the characters in question. For example, the character referred to as "space" has a character code of (decimal) 32, the character referred to as "colon" has a character code of (decimal) 58, and the character referred to as "quote" has a character code of (decimal) 34. Also, the process description makes use of the notation "info[propertyName]". This is to be understood to represent the value of the property whose name is propertyName on the information item info.

The following process is described in relation to a number of functions as follows: the function serialize, the function recurse, the function, escape, the functions sort and compare, the function wildcarded, and the function wildcardOutputRoot.

The Function Serialize

The serialization of the schema-canonicalized infoset, and thus the output of the overall SCC process, is defined to be the octet sequence that results from the function invocation serialize(d), where d is the document information item in the schema-canonicalized infoset, and serialize is the function defined as follows.

The serialize function is defined recursively in terms of the serialization of individual types of information item. Let the functions recurse, sort, escape, wildcarded, and wildcardOutputRoot be defined as set forth later. Let info be an arbitrary information item. Let serialize be the function taking an information item as input and returning an sequence of octets as output which is defined as follows.

1. If info is a document information item, then serialize(info) is the in-order concatenation of the following:
    a. if info[omitted] is false, and if either info[notations] or info[unparsed entities] contains a notation or an unparsed entity information item (respectively) whose [omitted] property is false, then
        i. the characters "<!DOCTYPE"
        ii. the appropriate case from the following
            1. if wildcarded(info[document element]) is false, then if info[document element][normalized prefix] is not no value, then the characters thereof, followed by a colon
            2. if wildcarded(info[document element]) is true, then if info[document element][prefix] is not no value, then the characters thereof, followed by a colon
        iii. the characters of info[document element][local name]
        iv. the characters "["
        v. recurse(sort(info[notations]))
        vi. recurse(sort(info[unparsed entities]))
        vii. the characters "]>"
    b. recurse(info[children])
2. If info is an element information item, then serialize(info) is:
    a. if info[validation attempted] is full or partial and info[validity] is not valid, then a fatal error occurs.
    b. otherwise, the in-order concatenation of the following:
        i. if info[omitted] is false, then
            1. the character "<"
            2. the appropriate case from the following:
                a. if wildcarded(info) is false, then if info[normalized prefix] is not no value, then the characters thereof, followed by a colon
                b. if wildcarded(info) is true, then if info[prefix] is not no value, then the characters thereof, followed by a colon 3. the characters of info[local name]
4. if info[normalized namespace attributes] exists, then recurse(sort(info[normalized namespace attributes]))
5. if wildcardOutputRoot(info) is true, then recurse (sort(N)), where N is info[in-scope namespaces] but with the item therein having the prefix "xml" removed.
6. if wildcarded(info) is true and wildcardOutputRoot(info) is false, then recurse(sort(info [namespace attributes])).

ii. recurse(sort(info[attributes]))
iii. if info[omitted] is false, then
  1. the character ">"
iv. the appropriate case from the following:
  1. if the property info[prefix & schema normalized value] is present, then
    a. if info[children] contains any character information item c where c[omitted] is true, then the empty octet sequence,
    b. otherwise, escape(info[prefix & schema normalized value])
  2. else if the property info[schema normalized value] is present, then
    a. if info[children] contains any character information item c where c[omitted] is true, then the empty octet sequence,
    b. otherwise, escape(info[schema normalized value]),
  3. else if at least one member of info[children] is an element information item which possesses a [validating model group all] property, then let the subsequence of info[children] consisting of all those elements which possess a [validating model group all] property be partitioned into into k subsequences $l_1$ to $l_k$ such that k is as small as possible and all items of a given subsequence share the same model group information item for their [validating model group all] property (XML Schema assures that this is well-defined), and let children' be a re-ordering of info[children] according to the following constraints:
    a. if an item c of info[children] possesses a [validating model group all] property, and is therefore contained in subsequence $l_i$ for some i, then the relative order of c in children' with respect to
      i. any item d of $l_i$ different than c is the same as the relative ordering of c and d in sort($l_i$)
      ii. any item e of $l_j$ (for some i≠j) is the same as the relative ordering of the first items of $l_i$ and $l_j$
      iii. any other item f of info[children] is the same as the relative ordering in info[children] of f with that item g of $l_i$ where the index of g in $l_i$ is the same as the index of c in sort($l_i$)
    b. if items m and n of info[children] do not posses a [validating model group all] property, then they occur in children' in the same relative order as they occur as items in info[children] then, recurse(children')
  4. otherwise, recurse(info[children])

v. if info[omitted] is false, then
  1. the characters "</"
  2. the appropriate case from the following:
    a. if wildcarded(info) is false, then if info[normalized prefix] is not no value, then the characters thereof, followed by a colon
    b. if wildcarded(info) is true, then if info[prefix] is not no value, then the characters thereof, followed by a colon
  3. the characters of info[local name]
  4. the character ">"

3. If info is an attribute information item, then serialize(info) is the in-order concatenation of the following:
  a. if info[omitted] is false, then
    i. the character space
    ii. the appropriate case from the following:
      1. if wildcarded(info) is false, then if info[normalized prefix] is not no value, then the characters thereof, followed by a colon
      2. if wildcarded(info) is true, then if info[prefix] is not no value, then the characters thereof, followed by a colon
    iii. the characters of info[local name]
    iv. the character "="
    v. the character quote
    vi. the appropriate case of the following:
      1. if the property info[prefix & schema normalized value] is present, then escape(info[prefix & schema normalized value])
      2. if info[schema normalized value] exists, then escape(info[schema normalized value])
      3. otherwise (the attribute was wildcarded), escape (info[normalized value])
    vii. the character quote
  b. otherwise, the empty octet sequence 4. If info is a namespace information item, then serialize (info) is the in-order concatenation of the following:
  a. if info[omitted] is false, then
    i. the character space
    ii. the characters "xmlns:"
    iii. the characters of info[prefix]
    iv. the character "="
    v. the character quote
    vi. escape(info[namespace name])
    vii. the character quote
  b. otherwise, the empty octet sequence 5. If info is an unparsed entity information item, then serialize(info) is the in-order concatenation of the following:
  a. if info[omitted] is false, then
    i. the characters "<!ENTITY"
    ii. the character space
    iii. info[name]
    iv. the character space
    v. the appropriate case of the following
      1. if info[public identifier] is not no value, then the in-order concatenation of the following:
        a. "PUBLIC"
        b. the character space
        c. info[public identifier]
        d. the character space
        e. info[system identifier]
      2. otherwise, the in order concatenation of the following:
        a. "SYSTEM"
        b. the character space
        c. info[system identifier]

vi. if info[notation name] is not no value, then the in-order concatenation of the following:
1. the character space
2. "NDATA"
3. the character space
4. info[notation name]
vii. the character ">"
b. otherwise, the empty octet sequence
6. If info is a notation information item, then serialize(info) is the in-order concatenation of the following:
a. if info[omitted] is false, then
i. the characters "<!NOTATION"
ii. the character space
iii. info[name]
iv. the character space
v. the appropriate case of the following
1. if info[public identifier] and info[system identifier] are not both no value, then the in-order concatenation of the following:
a. "PUBLIC"
b. the character space
c. info[public identifier]
d. the character space
e. info[system identifier]
2. else if info[public identifier] has no value, the in-order concatenation of the following:
a. "SYSTEM"
b. the character space
c. info[system identifier]
3. otherwise, the in-order concatenation of the following
a. "PUBLIC"
b. the character space
c. info[public identifier]
vi. the character ">"
b. otherwise, the empty octet sequence
7. Otherwise (this includes processing instruction, unexpanded entity reference, character, comment, and document type declaration information items, though characters and DTD's are accounted for by other means), serialize(info) is the empty sequence of octets.

The Function Recurse

The function recurse is a function which takes as input an ordered list infos of information items and proceeds as follows.

First, character information items in infos whose [omitted] property is 'true' are pruned by removing them from the list. Next, the pruned list is divided into an ordered sequence of sub-lists $l_i$ through $l_k$ according to the rule that a sub-list which contains character items may not contain other types of information items, but otherwise k is as small as possible. The result of recurse is then the in-order concatenation of processing in order each sub-list $l_i$ in turn in the following manner:

1. If $l_i$ contains character information items, then let $s_i$ be the string of characters of length equal to the size of $l_i$ where the ISO 10646 character code of the nth character of $s_i$ is equal to the [character code] property of the nth character of $l_i$. The output of processing $l_i$ is then the result of the function invocation escape($s_i$).
2. If $l_i$ does not contain character information items, then the output of processing $l_i$ is the in-order concatenation of serialize(info) as info ranges in order over the information items in the sub-list $l_i$.

The Function Escape

The function escape is that function which takes as input a string s and returns a copy of s where each occurrence of any of the five characters & < >'" in s is replaced by its corresponding predefined entity.

The Functions Sort and Compare

The function sort takes as input an unordered set or an ordered list of information items and returns an ordered list of those information items arranged in increasing order according to the function compare, unless some of the information items do not have a relative ordering, in which case an error occurs.

The function compare takes two information items a and b as input and returns an element of {less than or equal, greater than or equal, no relative ordering} as output according to the following:

1. If a and b are both attribute information items, then (as in Canonical XML) less than or equal or greater than or equal is returned according to a lexicographical comparison with the [namespace name] property as the primary key and the [local name] as the secondary key.
2. If a and b are both element information items, then less than or equal or greater than or equal is returned according to a lexicographical comparison with the [namespace name] property as the primary key and the [local name] as the secondary key.
3. If a and b are both namespace information items, then less than or equal or greater than or equal is returned according to a lexicographical comparison with the [namespace name] property as the primary key and the [prefix] property as the secondary key.
4. If a and b are both notation information items, then less than or equal or greater than or equal is returned according to a comparison of their [name] properties
5. If a and b are both unparsed entity information items, then less than or equal or greater than or equal is returned according to a comparison of their [name] properties
6. Otherwise, no relative ordering is returned.

The Function Wildcarded

The function wildcard takes an element or an attribute information as input and returns a boolean indicating whether validation was not attempted on that item. In the SCC process, validation of an information item will only not be attempted as a consequence of the item or a parent thereof being validated against a wildcard whose {process contents} property is either skip or lax.

Let i be the information item input to wildcarded. The function is then defined as follows:

1. If i[validation attempted] is none, then true is returned.
2. Otherwise, false is returned.

The Function WildcardOutputRoot

The function wildcardOutputRoot takes an element item as input and returns a boolean indicating whether the item is an appropriate one on which to place the contextual namespace declarations necessary for dealing with wildcarded items contained therein.

Let e be the information item input to wildcardOutputRoot. The function is then defined as follows:

1. If e[omitted] is true, then false is returned.
2. If wildcarded(e) is false and e[attributes] contains any attribute items a for which wildcarded(a) is true, then true is returned.
3. If wildcarded(e) is true, and there does not transitively exist any [parent] element item p of e where either the preceding clause (2) applies or both p[omitted] is false and wildcarded(p) is true, then true is returned. Otherwise, false is returned.

Equality Comparison Using Schema-Centric Canonicalization

The above sections describe the schema-centric canonicalization. While this process is robust in its comparison, a system using this process may be adapted to more easily determine of two information sets are not equal without having to invoke the schema-centric canonicalization approach. The following sections describe another process that may be used in combination with the Schema-Centric Canonicalization process or may be used separately.

Overview of Equality Comparison

As mentioned above, the information conveyed by a piece of XML may generally only be understood by considering the content of the information set for that XML together with the content of the schemas with which it is associated. Comparing the length or hash representations of two XML data sets is inconclusive.

One of the benefits of the SCC process is that the result of processing some XML through SCC captures in its output all of the information content of the XML that was latent in the schemas with which it is associated. All the contributions such as default values, data type lexical canonicalization, and so on, are extracted and made explicitly manifest in the canonicalized form. Therefore, one can, succinctly, compare two XML information items for equality by comparing the bit strings of their respective processing by SCC. In this regard, the items are equal if and only if the bit strings are bit-for-bit identical.

One downside of the SCC process described above is that it may be at least as complicated to implement as a full-blown XML Schema validity assessment, which is unfortunately in many situations more expensive than is reasonable. In order to address the complexity issue, aspects of the present invention relate to providing an equality comparison process that may be used with the SCC process or alone that can, in certain identifiable common cases, evaluate whether two XML items are equal or not in the same sense as processing through the SCC process would do but without the expense involved. In particular, the described equality comparison process provides an equality determination without the expense of retrieving and processing the associated schemas. When the equality comparison process identifies that the common case is in use, it can quickly give a definitive answer. If not the common cases are being compared, then the full treatment of the schema-centered canonicalization process may be used to determine if the XML data is identical.

It is appreciated that a variety of auxiliary equality processes are possible, differing in exactly which set of common cases they cover. One possible process is described here as the equalQuickItem function as described below. It is appreciated that one of ordinary skill in the art may modify the described function to address a different set of common cases without departing from the scope of the invention.

Specification of Equality Comparison

Figure 9:
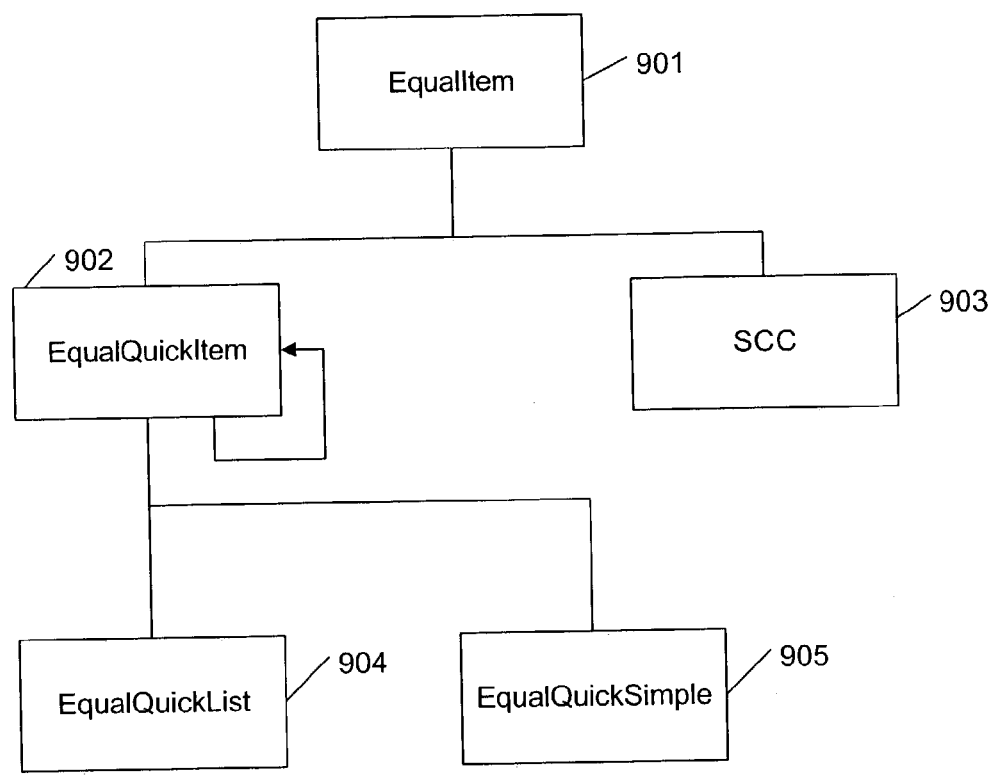
FIG. 9 shows a process for performing an equality comparison of XML data sets as an alternative embodiment of the present invention.

The following describes how an equality comparison may function. Two XML information items, left and right, are to be considered equal or not equal according to the application of the function equalItem(left, right). FIG. 9 shows an example of how various functions may interrelate. Here, an equalItem function 901 may call both the equalQuickList function 902 and the schema-centric canonicalization 903 (described above). equalQuickList 902 may call itself, the equalQuickItem function 904, and the equalQuickSimple function 905. Each is treated below.

The EqualItem Function

Figure 10:
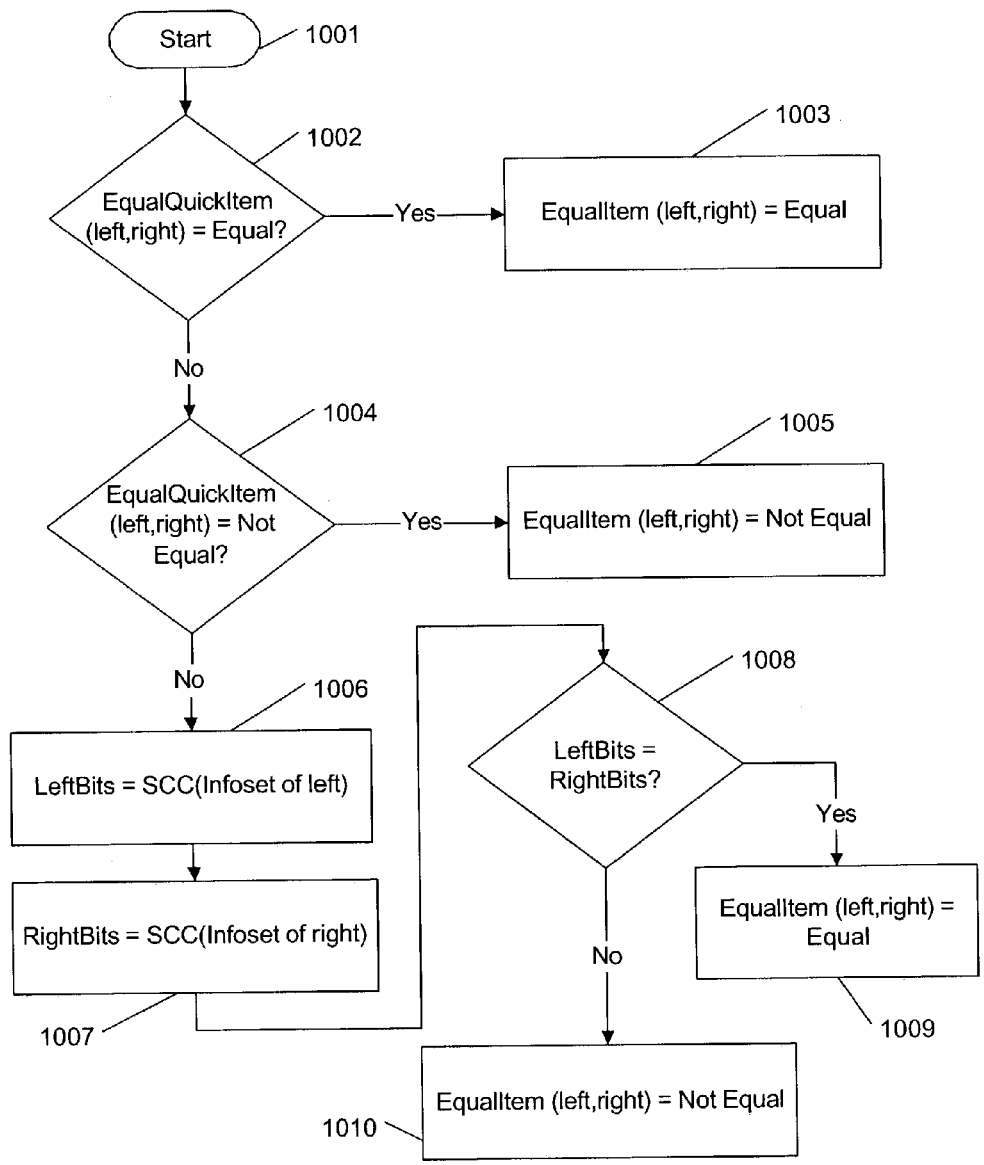
FIG. 10 shows an equalItem function in accordance with embodiments of the invention.

The equalItem function 901 receives two information items, left and right, as inputs and returns either the result equal or the result not equal as shown in FIG. 10 and as follows:
1. The system starts in step 1001.
2. If equalQuickItem(left, right) is equal in step 1002, then equalItem(left, right) is equal (step 1003).
3. If equalQuickItem(left, right) is not equal in step 1004, then equalItem(left, right) is not equal (step 1005).
4. If no, from step 1004, let leftBits (step 1006) and rightBits (step 1007) respectively be result of the execution of the SCC process (step 903) on an infoset whose document information item contains in its [children] property the item left or right, respectively.
5. In step 1008, if leftBits is identical to the bit string rightBits, then equalItem(left, right) is equal in step 1009. Otherwise, in step 1010, equalItem(left, right) is not equal.

The EqualQuickItem Function

The equalQuickItem function 902 takes two information items, left and right, as inputs and yields the result equal, not equal, or indeterminate according to whether it determines that the information items can be determined to be equal or not or that an evaluation by a more comprehensive algorithm is needed to determine equality. The equalQuickItem function is shown in FIGS. 11A through 11F.

Let the notation x[y] be understood to represent the value of the property whose name is y of the information item x. Then the equalQuickItem function is defined as follows:
1. The left and right data sets are received step 1101.
2. If the left and right data sets are different kinds of information items in step 1102, then not equal is returned in step 1103.
3. If left and right are both element information items (in step 1102), then the system determines whether both left and right are element information items in step 1104. If no, then the process steps to node G 1142.
4. If yes, then the process determines whether the left [namespace name] is not identical to the right [namespace name] in step 1105. If yes, then not equal is returned in step 1106.
5. If no from step 1105, then the left[local name] is checked whether it is not identical to right[local name] in step 1107. If yes, then not equal is returned in step 1108.
6. If no from step 1107, then the sets of left[attributes] and right[attributes] are examined to define the value attributesIdentical(left,right) in step 1109 and following:
   a. In step 1110, if a permutation r' of right[attributes] exists such that equalQuickList(left[attributes], r') is equal, then attributesIdentical(left,right) is equal in step 1111.
   b. Otherwise, in step 1112, if left[attributes] contains a member ll and right[attributes] contains a member rr where both
      i. ll[namespace name] is identical to rr[namespace name] and ii. ll[local name] is identical to rr[local name] (as shown in the comment bubble)
then if equalQuickItem(ll, rr) is not equal, then attributesIdentical(left, right) is not equal in step 1113.

c. Otherwise, (continuing through node C 1114) in FIG. 11B in step 1115, if left[attributes] contains a member ll and right[attributes] contains a member rr where both i. ll[namespace name] is identical to rr[namespace name] and ii. ll[local name] is identical to rr[local name] (shown in the comment bubble of 1115)

then if equalQuickItem(ll, rr) is indeterminate, then attributesIdentical(left,right) is indeterminate in step 1116.

d. Otherwise, attributesIdentical(left,right) is indeterminate in step 1116 as well. This may occur due to the potential existence of default attributes in the DTD or schema. The process continues through node 1117.

7. From node 1117 shown in FIG. 11C, the ordered lists left[children] and right[children] are examined to define the value childrenIdentical(left, right). As shown in the comment bubble of step 1118, let lec be the subsequence of left[children] and rec be the subsequence of right[children] consisting of only the element and character information items (thus, comment, processing instruction, and unexpanded entity reference items are ignored, just as they are by XML Schema).

a. In step 1118, if equalQuickList(lec, rec) is equal, then childrenIdentical(left, right) is equal in step 1119. In other words, an exact match guarantees equality between the children left and right are equal.

b. Otherwise, in step 1120, let le and re be respectively the subsequences of lec and rec containing only element information items. If there does not exist a permutation re' of re such that equalQuickList(le, re') is equal or indeterminate, then childrenIdentical(left, right) is not equal (step 1121). This is because to accommodate the potential existence in the schema of a model group with a {compositor} of all, possibly even in a content model with content type mixed, the potential reordering of the elements in comparing for equality should be included. However, if no reordering is achievable, then it is certain that no equality between the left and right data sets is possible. (A compositor is defined in the XML Schema, http://www.w3.org/TR/xmlschema-1/#Model_Group_details. A compositor is either an all, a choice, or a sequence, and denotes the necessary relationship between a set of (potential) child element information items and its parent element information item.)

c. If no, then, from step 1122, if one of the lists lec and rec is empty and the other contains only character information items, then childrenIdentical(left, right) is indeterminate in step 1123. This is because the schema might indicate that a default content value (which is equal to the non-empty list).

d. If no, then the process continues, through node E step 1124, to FIG. 11D. From step 1125, if both of the lists lec and rec contain only character information items, then childrenIdentical(left, right) is the value returned by equalQuickSimple(lec, rec, false) in step 1126. This is because element content consisting entirely of characters may be an occurrence of the use of simple types and should be evaluated as simple types.

e. If no, then, if at least one of lec and rec contains any element information items (step 1127) and at least one of lec or rec contains any non-whitespace character information items (step 1128), then this means that the content must be mixed. Next, step 1129 is executed that lets the character information items in lec and rec be divided respectively into sequences of sub-lists $l_i$ through $l_k$ and $r_i$ through $r_k$ such that k-1 is the number of element information items in each of lec and rec (which are necessarily the same due to step 1120 above). Also, step 1130 is executed where any given $l_i$ or $r_i$ consists of all those character items in order in lec or rec that are separated therein by two consecutive element items or an element item and the start or end of the list as the case may be. Next, in step 1131, if there exists any $l_i$ and corresponding $r_i$ such that equalQuickList($l_i, r_i$) is not equal, then childrenIdentical(left, right) is not equal (step 1132) (the characters used in mixed content must match exactly).

f. Otherwise, from steps 1127, 1128, and 1131, childrenIdentical(left, right) is indeterminate in step 1133.

Figure 11A:
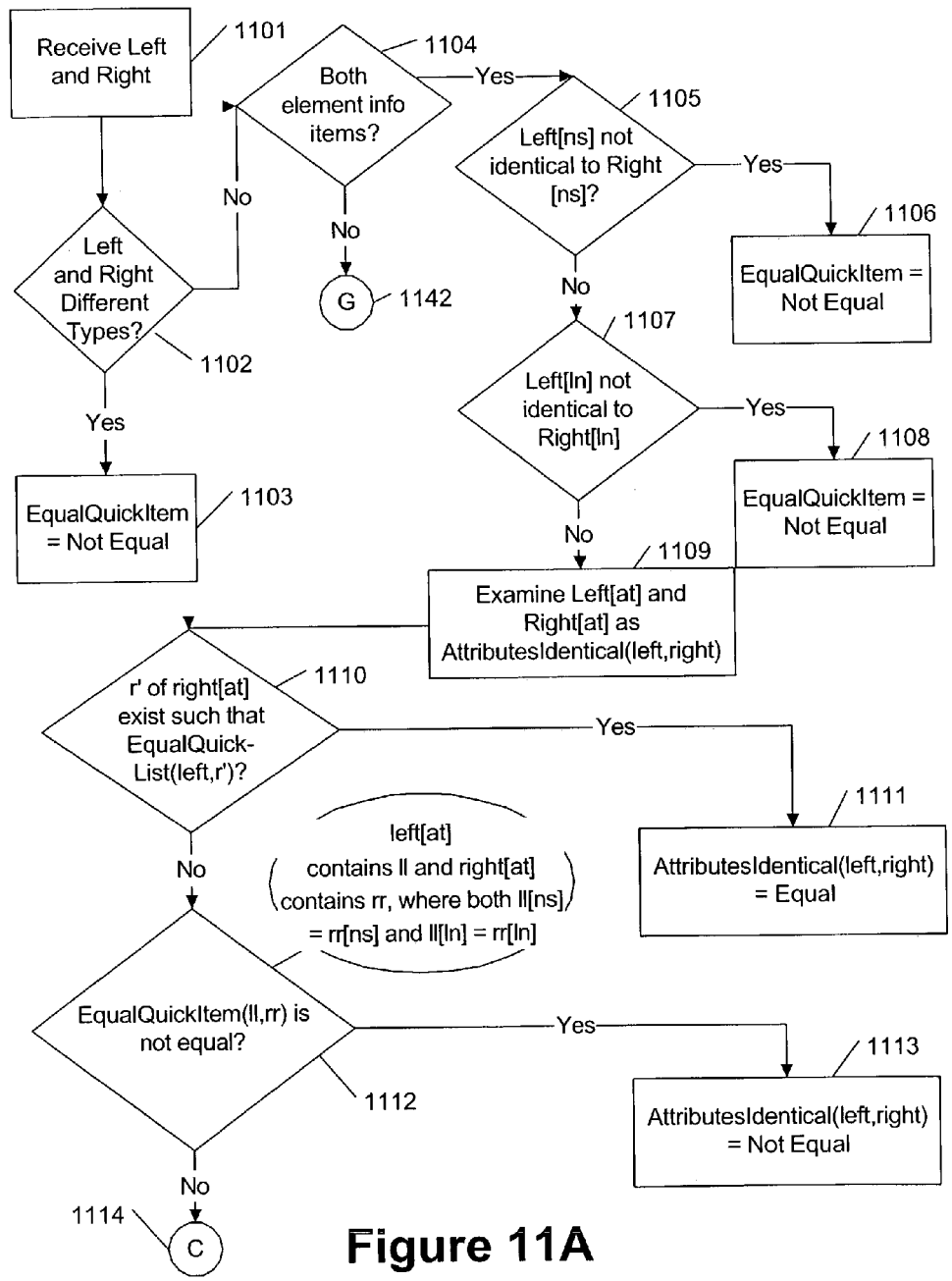
Figure 11B:
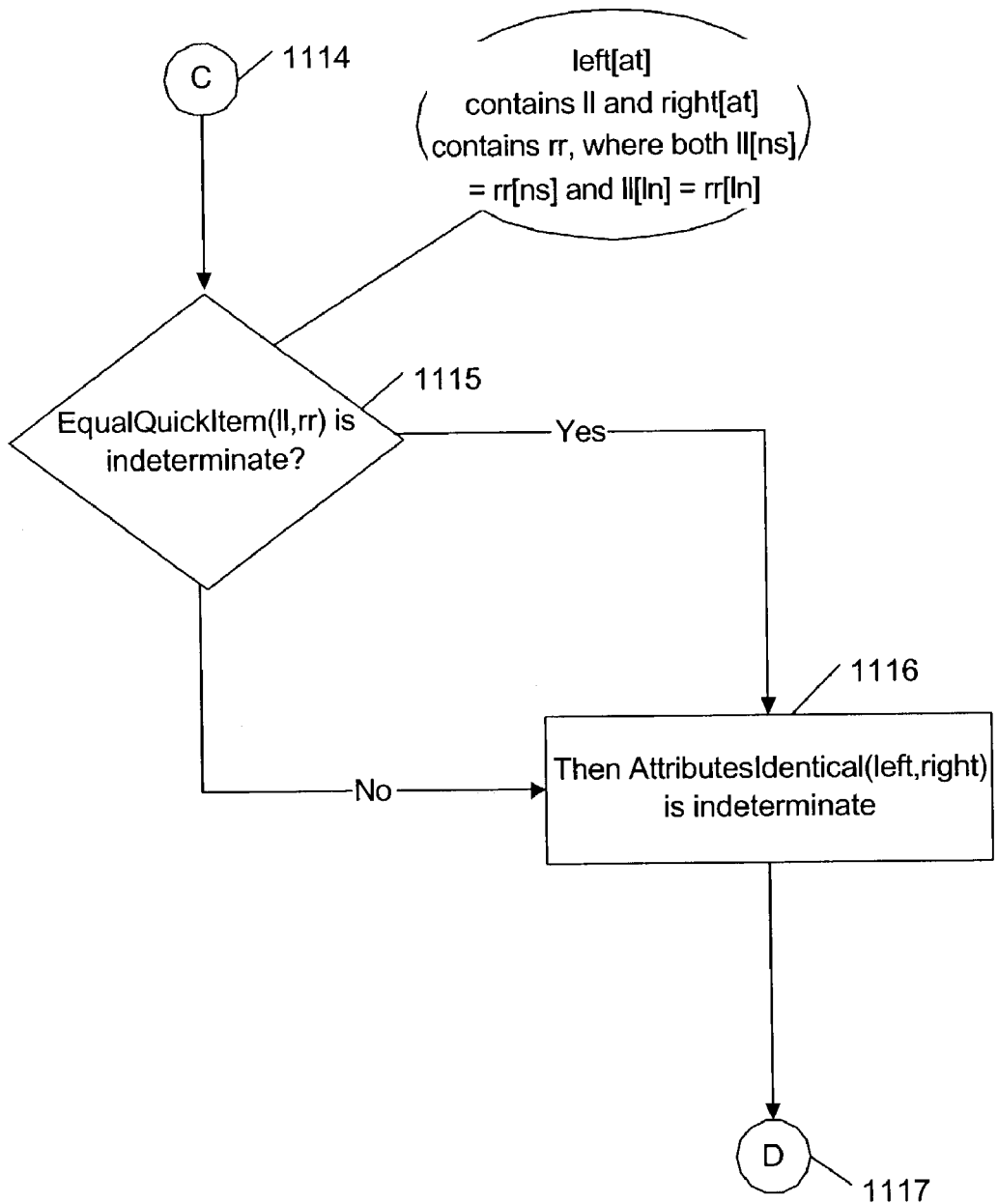
Figure 11C:
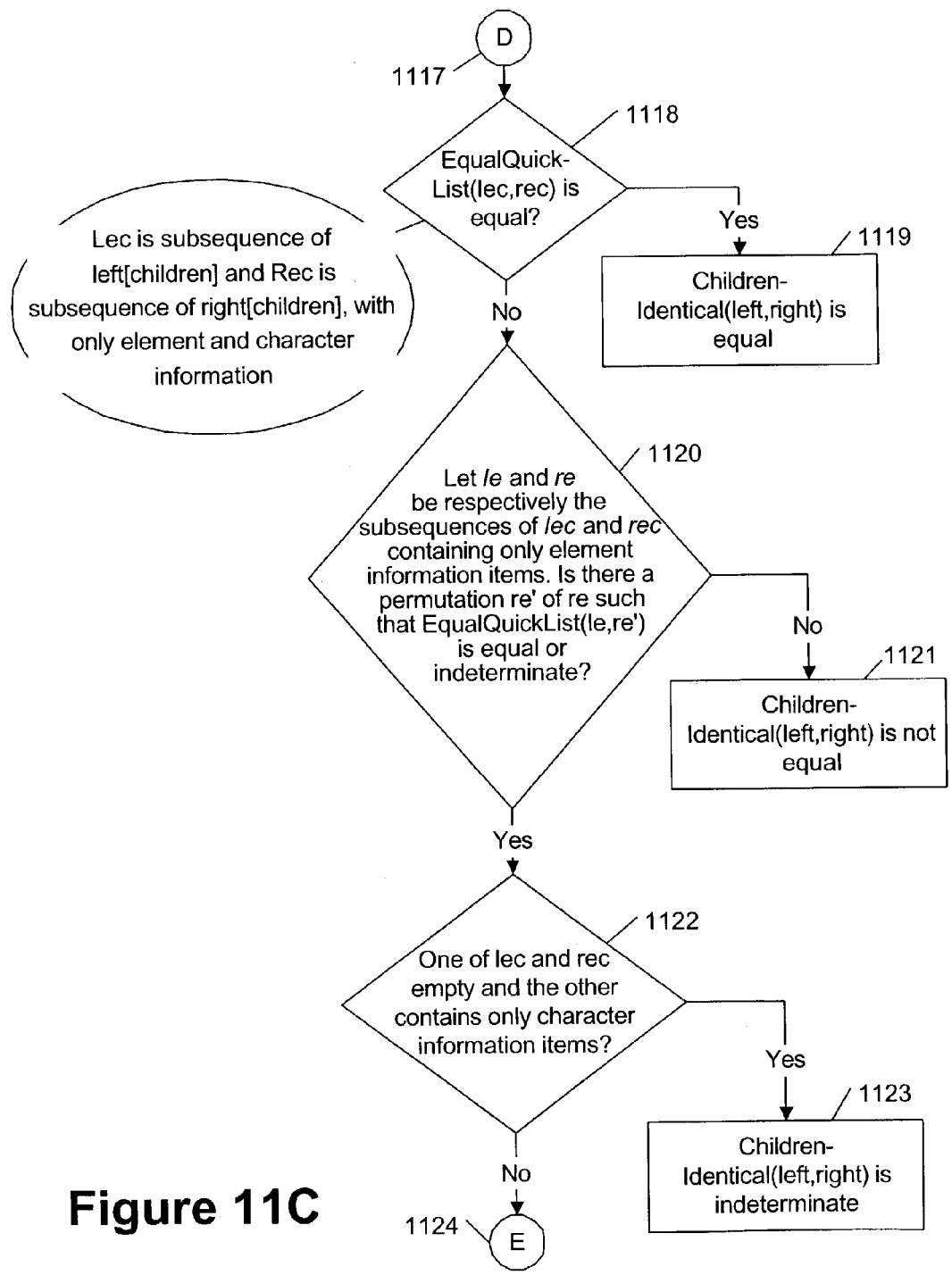
Figure 11E:
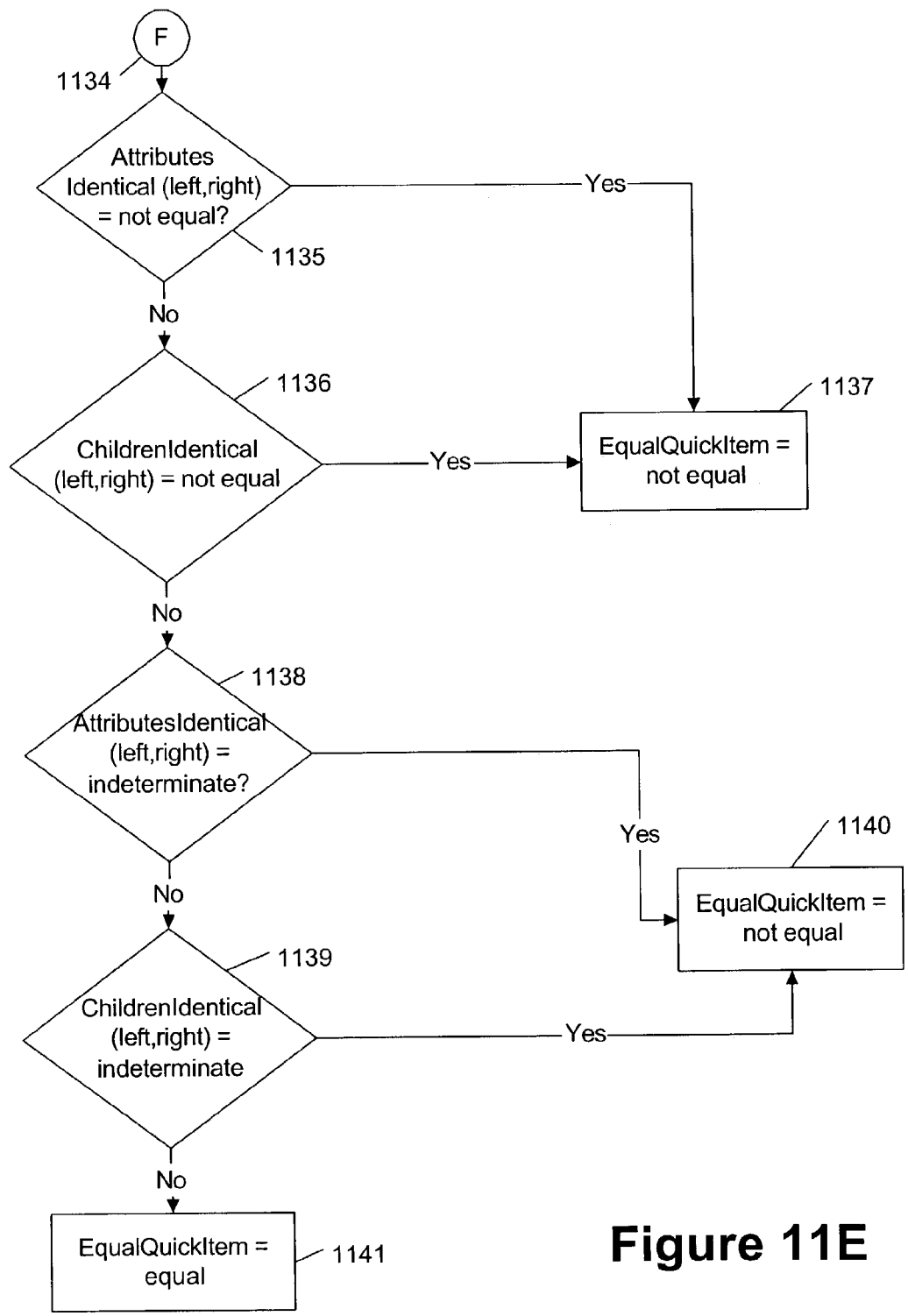

Continuing through node 1134 to FIG. 11E:

8. If either attributesIdentical(left,right) is not equal (step 1135) or childrenIdentical(left, right) is not equal (step 1136), then not equal is returned (step 1137).

9. Otherwise, if either attributesIdentical(left,right) is indeterminate (step 1138) or childrenIdentical(left, right) is indeterminate (step 1139), then indeterminate is returned (step 1140).

10. Otherwise, equal is returned in step 1141.

Figure 11F:
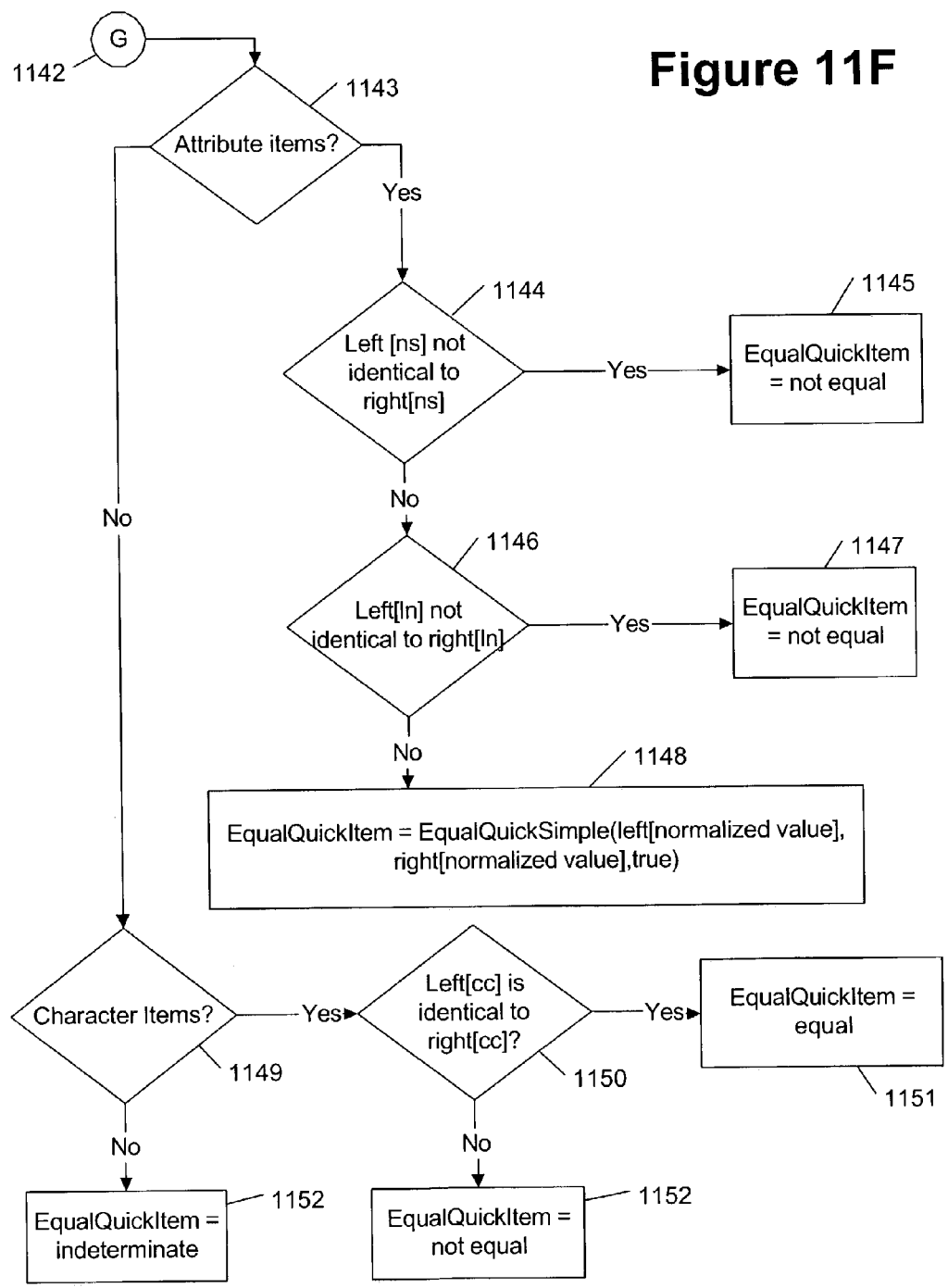

Referring back to node G of FIG. 11A and continuing to FIG. 11F, if left and right are attribute information items (step 1143), then the following steps are executed:

1. In step 1144, if left[namespace name] is not identical to right[namespace name], then not equal is returned in step 1145.

2. In step 1146, if left[local name] is not identical to right[local name], then not equal is returned in step 1147.

3. Otherwise, equalQuickSimple(left[normalized value], right[normalized value], true) is returned as the value for EqualQuickItem in step 1148.

If left and right are character information items (step 1149), the following are executed:

1. If left[character code] is the same as right[character code] in step 1150, then equal is returned in step 1151.

2. Otherwise, not equal is returned in step 1152.

Finally, if left and right are the same from step 1102, yet are not element items (step 1104), not attribute items from 1143, and not character items from 1149, then indeterminate is returned in step 1151. It is appreciated that other item sets may evolve over time. Accordingly, step 1151 is not intended to be limiting in that other branches may occur to account for new information sets. The equalquickitem function can evolve to accommodate these additional branches.

The equalQuickList Function

Figure 12:
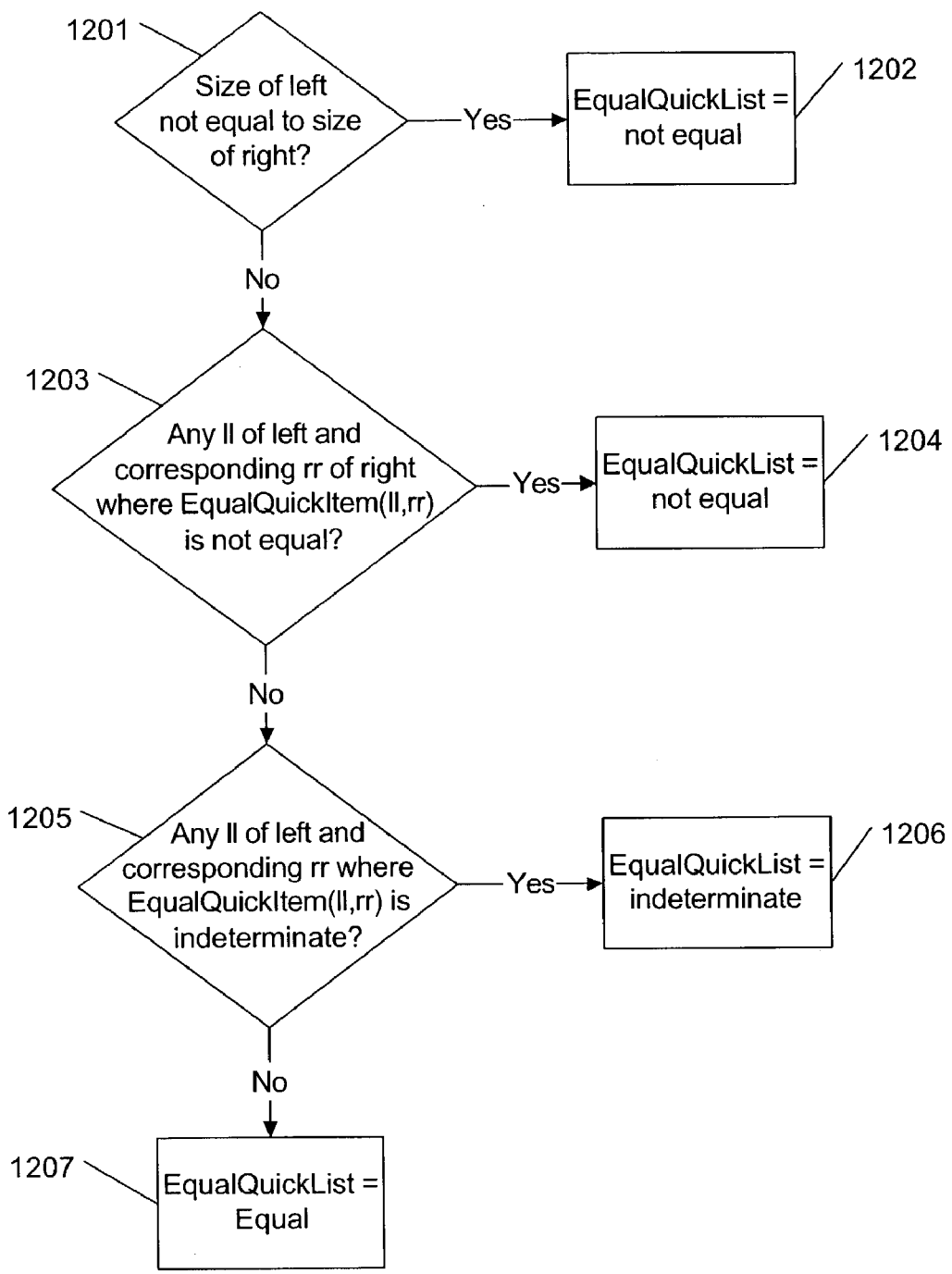
FIG. 12 shows an equalQuickList function in accordance with embodiments of the invention.

The equalQuickList function is shown in FIG. 12. The equalQuickList function takes as input two ordered lists of information items left and right and returns equal, not equal, or indeterminate as follows:

1. If the size of left differs from the size of right (step 1201), then not equal is returned in step 1202.
2. If there exists any member ll of left and corresponding member rr of right such that equalQuickItem(ll, rr) is not equal (step 1203), then not equal is returned (step 1204).
3. If there exists any member ll of left and corresponding member rr of right such that equalQuickItem(ll, rr) is indeterminate (step 1205), then indeterminate is returned in step 1206.
4. Otherwise, equal is returned in step 1207.

The EqualQuickSimple Function

Figure 13:
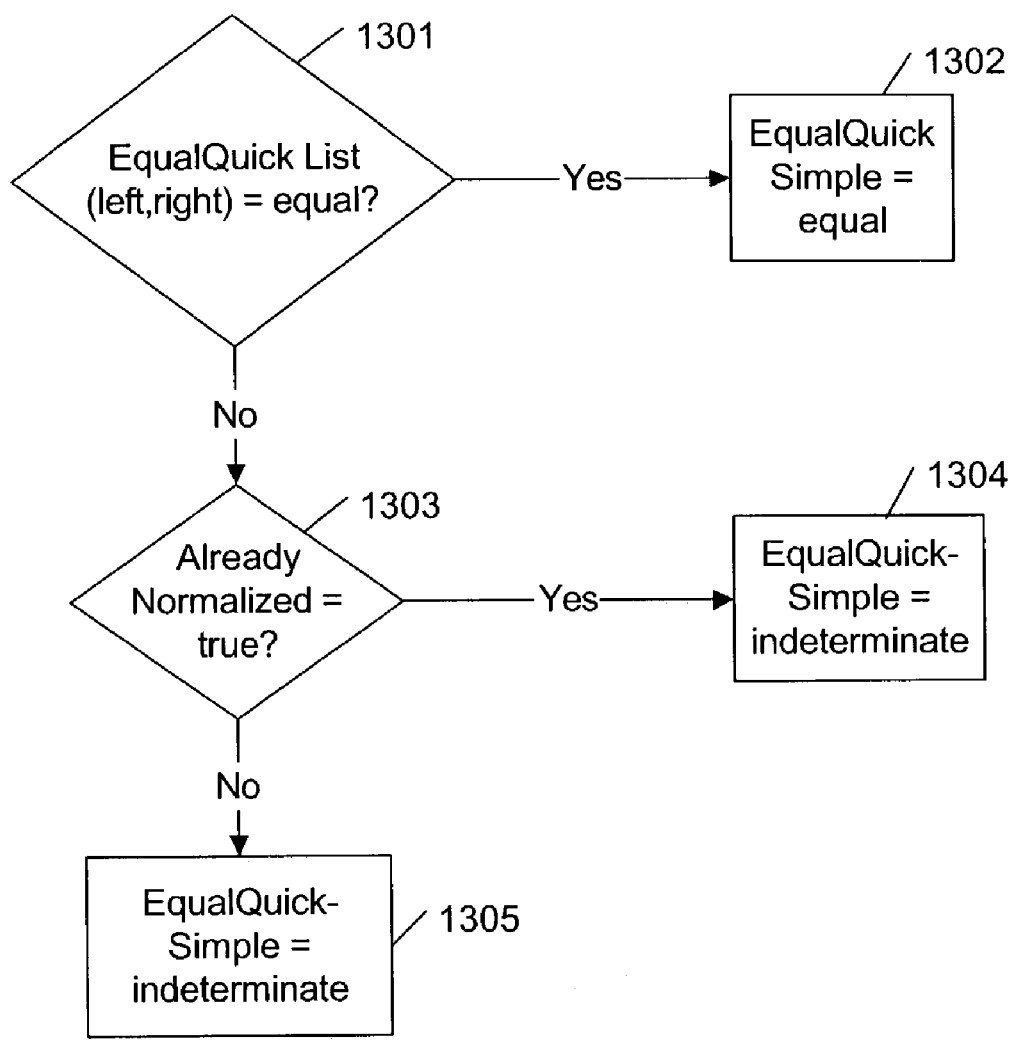
FIG. 13 shows an equalQuickSimple function in accordance with embodiments of the invention.

Shown in FIG. 13, the equalQuickSimple function encompasses the appropriate comparison tests for a sequence of characters that are either known to be or may potentially be the data consisting of a simple type. The equalQuickSimple function takes as input two sequences of character information items left and right and a boolean isAlreadyNormalized and returns equal, not equal, or indeterminate as follows:

1. If equalQuickList(left, right) is equal in step 1301, then equal is returned in step 1302. Here, an exact match guarantees equality.
2. Otherwise, in step 1303, if alreadyNormalized is true, then indeterminate is returned in step 1304. In other words, if left and right are not identical, then their canonicalized lexical representations still might be identical. A more elaborate implementation might perhaps consider each of the various data types and their possible canonicalized lexical representations in order to, in some situations, provide a not equal instead of indeterminate result.
3. Otherwise, if isAlreadyNormalized is false from step 1303, then indeterminate is returned in step 1305.

Further, embodiments of the invention may be implemented in hardware, software, or by an application specific integrated circuit (ASIC). The firmware may be in a read-only memory and the software may reside on a medium including, but not limited to, read-only memory, random access memory, floppy disc or compact disc.

While aspects of the present invention have been described with respect to XML Schema, it is appreciated that other XML description languages exist. For example, Document Type Definitions (DTDs) and RelaxNG relate to non-XML Schema description languages to which aspects of the present invention may be applied. Further, it is appreciated that XML Schema is evolving. The evolutionary followers to XML Schema (for example, XML Schema 1.1 and later versions) may be used with various aspects of comparing XML information described herein without departing from the scope of the invention.

Aspects of the present invention have been described in terms of illustrative embodiments. Numerous other embodiments, modifications and variations within the scope and spirit of the appended claims will occur to persons of ordinary skill in the art from a review of this disclosure.

I claim:

1. A computer-implemented process for comparing XML data in the form of data sets, said computer-implemented processing lacking complete knowledge of one or more XML schemas related to said XML data, said computer-implemented process comprising the steps of:
   creating standard information sets from XML data;
   normalizing characters in said standard information sets;
   assessing said standard information sets by an XML-schema-based analysis in which new properties are added;
   performing at least one additional transformation on said standard information sets resulting in schema-canonicalized information;
   serializing said schema-canonicalized information to produce serialized data sets;
   comparing the serialized data sets; and
   producing an output indicative of whether the XML data is equivalent.

2. The computer-implemented process according to claim 1, wherein XML schemas are associated with the data sets, yet the contents of one or more of said schemas are not known prior to the execution of the computer-implemented process.

3. A computer system for carrying out the computer-implemented process according to claim 1, wherein XML schemas are associated with the data sets, yet the contents of one or more of said schemas are not known until after creation of a computer system running said computer-implemented process.

4. A computer system for carrying out the computer-implemented process according to claim 1, wherein XML schemas are associated with the data sets, yet the contents of one or more of said schemas were created after creation of a computer system running said computer-implemented process.

* * * * *